(12) United States Patent  (10) Patent No.: US 12,205,272 B2
Inoue  (45) Date of Patent: Jan. 21, 2025

(54) PATTERN INSPECTION DEVICE AND PATTERN INSPECTION METHOD

(71) Applicant: NuFlare Technology, Inc., Yokohama (JP)

(72) Inventor: Hiromu Inoue, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 414 days.

(21) Appl. No.: 17/805,734

(22) Filed: Jun. 7, 2022

(65) Prior Publication Data

US 2022/0301138 A1  Sep. 22, 2022

Related U.S. Application Data

(63) Continuation of application No. PCT/JP2020/047233, filed on Dec. 17, 2020.

(30) Foreign Application Priority Data

Jan. 10, 2020 (JP) .................. 2020-003015

(51) Int. Cl.
*G06T 7/00* (2017.01)
*G01N 21/95* (2006.01)
*G01N 21/956* (2006.01)

(52) U.S. Cl.
CPC ......... *G06T 7/001* (2013.01); *G01N 21/9501* (2013.01); *G01N 21/95607* (2013.01);
(Continued)

(58) Field of Classification Search
CPC ........... G06T 7/001; G06T 2207/10061; G06T 2207/30148; G06T 7/0006; G06T 7/12;
(Continued)

(56) References Cited

U.S. PATENT DOCUMENTS 6,016,201 A * 1/2000 Lin .................. G01N 21/95607
 356/636
6,326,618 B1 * 12/2001 Kane ...................... G01B 15/04
 250/307

(Continued)

FOREIGN PATENT DOCUMENTS

JP 2012-2663 A 1/2012
JP 2012-112974 A 6/2012
(Continued)

OTHER PUBLICATIONS

Japanese Office Action issued Mar. 7, 2023 in Japanese Patent Application No. 2021-569801 (with computer-generated English Translation), 4 pages.

(Continued)

*Primary Examiner* — Aaron W Carter
(74) *Attorney, Agent, or Firm* — Oblon, McClelland, Maier & Neustadt, L.L.P.

(57) ABSTRACT

According to one aspect of the present invention, a pattern inspection apparatus includes a uniform sizing processing circuit configured to resize a line width of a design pattern being a basis of the figure pattern by using a uniform sizing amount which has been set in advance; a reference image generation circuit configured to generate a reference image corresponding to the secondary electron image by performing image development on data of the design pattern whose line width has been resized; and a line-width dependent correction circuit configured to correct a line width of a figure pattern in the secondary electron image by using a correction amount which has been set in advance depending on a line width size.

22 Claims, 16 Drawing Sheets

(52) U.S. Cl.
CPC ............... *G06T 2207/10061* (2013.01); *G06T 2207/30148* (2013.01)

(58) Field of Classification Search
CPC .................. G06T 7/62; G01N 21/9501; G01N 21/95607; G01N 23/2251
See application file for complete search history.

(56) References Cited

U.S. PATENT DOCUMENTS

| | | | |
|---|---|---|---|
| 2005/0146714 A1* | 7/2005 | Kitamura | G06T 7/0004 356/237.2 |
| 2005/0205780 A1* | 9/2005 | Nakagaki | G01N 23/225 250/311 |
| 2007/0047798 A1* | 3/2007 | Isomura | G06T 7/001 382/147 |
| 2007/0192757 A1* | 8/2007 | Emi | B82Y 10/00 716/55 |
| 2007/0284525 A1* | 12/2007 | Kuribara | G01N 23/225 250/307 |
| 2008/0184190 A1* | 7/2008 | Yashima | H01J 37/3174 716/55 |
| 2009/0269686 A1* | 10/2009 | Ogata | H01L 21/67225 430/30 |
| 2012/0298862 A1 | 11/2012 | Chen et al. | |
| 2012/0328181 A1 | 12/2012 | Kitamura et al. | |
| 2015/0212019 A1 | 7/2015 | Shishido et al. | |
| 2016/0247267 A1* | 8/2016 | Hashimoto | G06T 7/001 |
| 2016/0267648 A1* | 9/2016 | Yamashita | G01B 11/002 |
| 2017/0132772 A1* | 5/2017 | Ogawa | G03F 1/84 |
| 2019/0213726 A1* | 7/2019 | Hirano | G01N 23/2251 |
| 2020/0159124 A1* | 5/2020 | Wang | G03F 7/705 |
| 2020/0161082 A1* | 5/2020 | Inoue | H01J 37/222 |
| 2020/0286709 A1* | 9/2020 | Shiratsuchi | H01J 37/22 |
| 2021/0042901 A1* | 2/2021 | Kaneko | G01N 23/2251 |
| 2022/0301138 A1* | 9/2022 | Inoue | G06T 7/001 |
| 2023/0145411 A1* | 5/2023 | Sugihara | G01N 21/956 382/151 |
| 2023/0170183 A1* | 6/2023 | Ogawa | G03F 7/7065 250/310 |
| 2024/0193355 A1* | 6/2024 | Yuri | G06T 7/0006 |

FOREIGN PATENT DOCUMENTS

| | | |
|---|---|---|
| JP | 2013-246062 A | 12/2013 |
| JP | 2014-517523 A | 7/2014 |

OTHER PUBLICATIONS

International Search Report issued Mar. 16, 2021 in PCT/JP2020/047233, filed on Dec. 17, 2020, therein, 2 pages.

Taiwanese Office Action issued on Sep. 3, 2021 in Taiwan Application 109146610 filed Dec. 29, 2020 (with Machine generated English translation), 10 pages.

* cited by examiner

EVALUATION FIGURE PATTERN WITH REFERENCE LINE WIDTH (100nm)

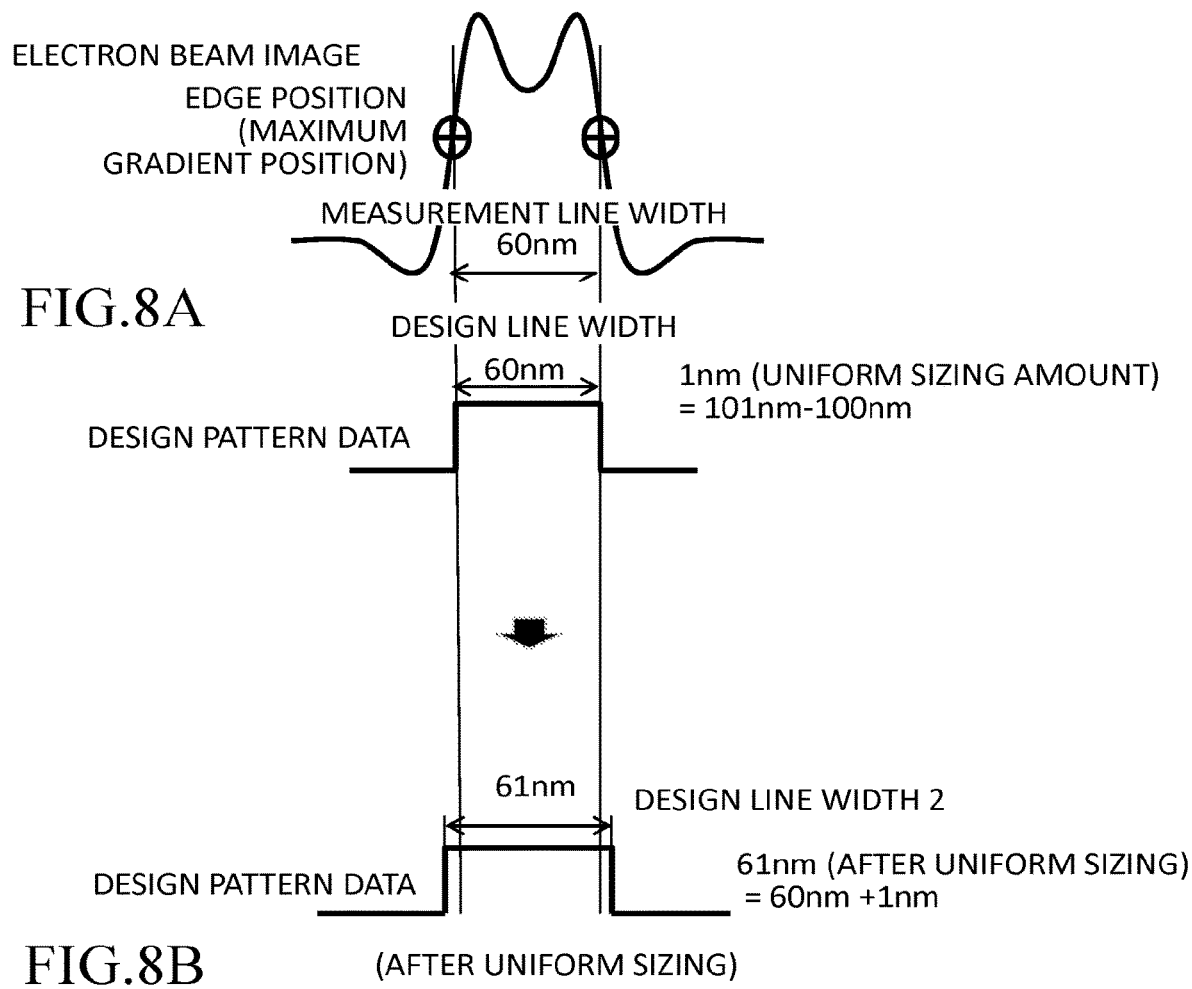
EVALUATION FIGURE PATTERN WITH LINE WIDTH 60nm

| | LINE WIDTH 100nm | LINE WIDTH 80nm | LINE WIDTH 60nm | LINE WIDTH 30nm | LINE WIDTH 20nm |
|---|---|---|---|---|---|
| MEASUREMENT LINE WIDTH (ACTUAL PATTERN) | 101 | 81 | 60 | 29 | 18 |
| DESIGN LINE WIDTH (DESIGN PATTERN) | 100 | 80 | 60 | 30 | 20 |
| ① - UNIFORM SIZING AMOUNT (CORRECTION AMOUNT) | 1 | 1 | 1 | 1 | 1 |
| ② CORRECTION AMOUNT PER LINE WIDTH | 0 | 0 | 1 | 2 | 3 |
| DESIGN LINE WIDTH 2=(DESIGN LINE WIDTH) + ① | 101 | 81 | 61 | 31 | 21 |
| LINE WIDTH OF DESIGN DATA (AFTER CORRECTION) = (DESIGN LINE WIDTH 2) - ① | 100 | 80 | 60 | 30 | 20 |
| LINE WIDTH OF ACTUAL PATTERN (AFTER CORRECTION) = (MEASUREMENT LINE WIDTH) - ① + ② | 100 | 80 | 60 | 30 | 20 |

FIG.9

PATTERN INSPECTION DEVICE AND PATTERN INSPECTION METHOD

CROSS-REFERENCE TO RELATED APPLICATION

This application is a continuation application based upon and claims the benefit of priority from prior Japanese Patent Application No. 2020-003015 (application number) filed on Jan. 10, 2020 in Japan, and International Application PCT/JP2020/047233, the International Filing Date of which is Dec. 17, 2020. The contents described in JP2020-003015 and PCT/JP2020/047233 are incorporated in the present application.

BACKGROUND OF THE INVENTION

Field of the Invention

Embodiments of the present invention relate to a pattern inspection apparatus and a pattern inspection method. For example, embodiments of the present invention relate to an inspection apparatus and method that performs inspection using a secondary electron image of a pattern emitted from the substrate irradiated with multiple electron beams.

Description of Related Art

With recent progress in high integration and large capacity of the LSI (Large Scale Integrated circuits), the line width (critical dimension) required for circuits of semiconductor elements is becoming increasingly narrower. Since LSI manufacturing requires an enormous production cost, it is essential to improve the yield. Meanwhile, as the scale of patterns which make up LSI has reached the order of 10 nanometers or less, dimensions to be detected as a pattern defect have become extremely small. Therefore, the pattern inspection apparatus for inspecting defects of ultrafine patterns exposed/transferred onto a semiconductor wafer needs to be highly accurate. Further, one of major factors that decrease the yield of the LSI manufacturing is due to pattern defects on a mask for exposing/transferring an ultrafine pattern onto the semiconductor wafer by the photolithography technology. Therefore, the pattern inspection apparatus for inspecting defects on an exposure transfer mask used in manufacturing LSI also needs to be highly accurate.

As a defect inspection method, there is known a method of comparing, using ultraviolet rays or electron beams, a measurement image acquired by imaging a pattern formed on a substrate such as a semiconductor wafer and a lithography mask with a reference image being based on design pattern data, or with another measurement image acquired by imaging an identical pattern on the same substrate.

In particular, in the die-to-database inspection which compares a measurement image with a reference image being based on design pattern data, it is required, in order to perform defect detection at a high sensitivity, that there is a high coincidence between the outline (edge, contour) of a figure pattern extracted from the reference image and the outline extracted from the measurement image, and/or a high coincidence between line widths of the figure pattern. Therefore, an inspection of coincidence between the outlines is performed (e.g., refer to Japanese Patent Application Laid-open (JP-A) No. 2020-170792).

In manufacturing substrates, such as semiconductor wafers and lithography masks, they are fabricated such that, using, for example, as an anchor a figure pattern having a reference line width, the anchors are coincident as much as possible. However, sometimes, a reference line width extracted from an SEM (Scanning Electron Microscope) image (measurement image) acquired by scanning an actually manufactured substrate with electron beams and a reference line width extracted from a reference image are not coincident even though no defect exists. Consequently, there is a problem of generation of a pseudo defect.

BRIEF SUMMARY OF THE INVENTION

According to one aspect of the present invention, a pattern inspection apparatus includes
  a secondary electron image acquisition mechanism configured to acquire, by using an electron beam, a secondary electron image of a figure pattern formed on a substrate;
  a uniform sizing processing circuit configured to resize a line width of a design pattern being a basis of the figure pattern by using a uniform sizing amount which has been set in advance;
  a reference image generation circuit configured to generate a reference image corresponding to the secondary electron image by performing image development on data of the design pattern whose line width has been resized;
  a line-width dependent correction circuit configured to correct a line width of a figure pattern in the secondary electron image by using a correction amount which has been set in advance depending on a line width size; and
  a comparison circuit configured to compare a line width of a figure pattern in the reference image with the line width, having been corrected by using the correction amount, of the figure pattern in the secondary electron image, the figure pattern in the secondary electron image being corresponding to the figure pattern in the reference image.

According to another aspect of the present invention, a pattern inspection apparatus includes
  a secondary electron image acquisition mechanism configured to acquire, by using an electron beam, a secondary electron image of a figure pattern formed on a substrate;
  a uniform sizing processing circuit configured to resize a line width of a design pattern being a basis of the figure pattern by using a uniform sizing amount which has been set in advance;
  a reference image generation circuit configured to generate a reference image corresponding to the secondary electron image by performing image development on data of the design pattern whose line width has been resized;
  a deviation amount calculation circuit configured to calculate a deviation amount between an edge position of a figure pattern in the reference image and an edge position of a figure pattern which corresponds to the figure pattern in the reference image, in the secondary electron image;
  a line-width dependent correction circuit configured to correct, in a case where a line width of a figure pattern concerned can be specified, the deviation amount by using a value of one-half of a correction amount which has been set in advance depending on a line width size; and
  a determination circuit configured to determine, in the case where the line width of the figure pattern concerned can be specified, whether a corrected deviation amount which has been corrected by using the value of one-half of the correction amount exceeds a first determination threshold.

According to yet another aspect of the present invention, a pattern inspection method includes
acquiring, by using an electron beam, a secondary electron image of a figure pattern formed on a substrate;
resizing a line width of a design pattern being a basis of the figure pattern by using a uniform sizing amount which has been set in advance;
generating a reference image corresponding to the secondary electron image by performing image development on data of the design pattern whose line width has been resized;
correcting a line width of a figure pattern in the secondary electron image by using a correction amount which has been set in advance depending on a line width size; and
comparing a line width of a figure pattern in the reference image with the line width, having been corrected by using the correction amount, of the figure pattern in the secondary electron image, the figure pattern in the secondary electron image being corresponding to the figure pattern in the reference image, and outputting a comparison result.

According to yet another aspect of the present invention, a pattern inspection method includes
acquiring, by using an electron beam, a secondary electron image of a figure pattern formed on a substrate;
resizing a line width of a design pattern being a basis of the figure pattern by using a uniform sizing amount which has been set in advance;
generating a reference image corresponding to the secondary electron image by performing image development on data of the design pattern whose line width has been resized;
calculating a deviation amount between an edge position of a figure pattern in the reference image and an edge position of a figure pattern which corresponds to the figure pattern in the reference image, in the secondary electron image;
correcting, in a case where a line width of a figure pattern concerned can be specified, the deviation amount by using a value of one-half of a correction amount which has been set in advance depending on a line width size; and
determining, in the case where the line width of the figure pattern concerned can be specified, whether a corrected deviation amount which has been corrected by using the value of one-half of the correction amount exceeds a first determination threshold.

BRIEF DESCRIPTION OF THE DRAWINGS

FIGS. 8A and 8B are illustrations showing an example of a profile of a measurement image having a line width other than a reference line width, design pattern data of the line width other than the reference line width, and design pattern data after uniformly sizing according to the first embodiment;

FIG. 9 is a table showing examples of a uniform sizing amount and a line-width dependent correction amount for each line width size according to the first embodiment;

DETAILED DESCRIPTION OF THE INVENTION

Embodiments of the present invention describe an apparatus and method that can inhibit/prevent a line width error between a measurement image and a reference image.

The embodiments below describe an electron beam inspection apparatus as an example of an inspection apparatus. Further, the embodiments below describe an inspection apparatus using multiple electron beams to acquire an image, but it is not limited thereto. An inspection apparatus using a single electron beam to acquire an image may also be employed.

First Embodiment

Figure 1:
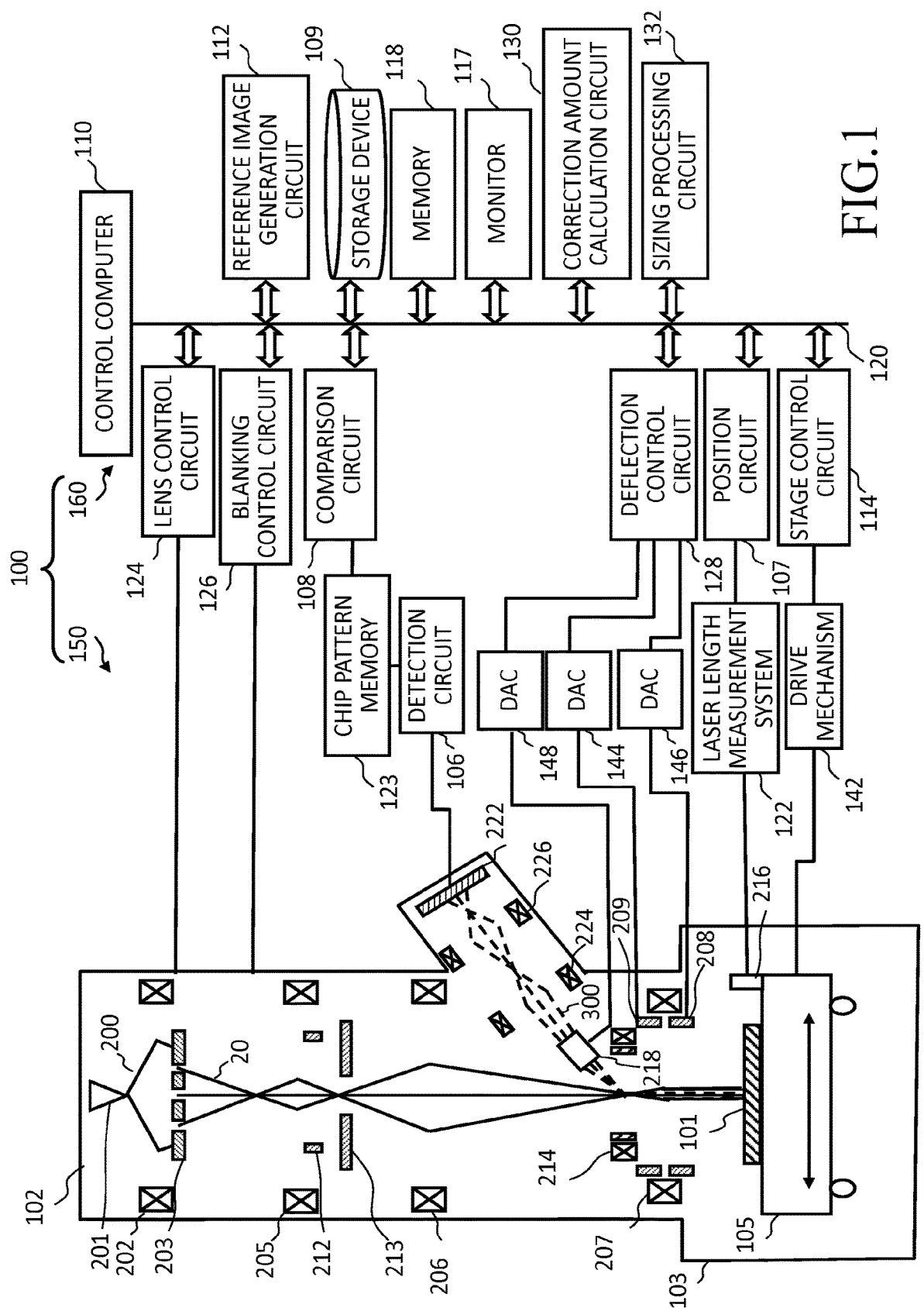
FIG. 1 is a diagram showing an example of a configuration of an inspection apparatus according to a first embodiment.

FIG. 1 is a diagram showing an example of a configuration of an inspection apparatus according to a first embodiment. In FIG. 1, an inspection apparatus 100 for inspecting a plurality of figure patterns formed on a substrate 101 is an example of a multi-electron beam inspection apparatus. The inspection apparatus 100 includes an image acquisition mechanism 150 (secondary electron image acquisition mechanism) and a control system circuit 160. The image acquisition mechanism 150 includes an electron beam column 102 (electron optical column) and an inspection chamber 103. In the electron beam column 102, there are disposed an electron gun 201, an electromagnetic lens 202, a shaping aperture array substrate 203, an electromagnetic lens 205, a bundle blanking deflector 212, a limiting aperture substrate 213, an electromagnetic lens 206, an electromagnetic lens 207 (objective lens), a main deflector 208, a sub deflector 209, a beam separator 214, a deflector 218, an electromagnetic lens 224, an electromagnetic lens 226, and a multi-detector 222. In the case of FIG. 1, a primary electron optical system which irradiates the substrate 101 with multiple primary electron beams is composed of the electron gun 201, the electromagnetic lens 202, the shaping aperture array substrate 203, the electromagnetic lens 205, the bundle blanking deflector 212, the limiting aperture substrate 213, the electromagnetic lens 206, the electromagnetic lens 207 (objective lens), the main deflector 208, and the sub deflector 209. A secondary electron optical system which irradiates the multi-detector 222 with multiple secondary electron beams 300 is composed of the beam separator 214, the deflector 218, the electromagnetic lens 224, and the electromagnetic lens 226.

In the inspection chamber 103, there is disposed a stage 105 movable at least in the x and y directions. The substrate 101 (target object) to be inspected is mounted on the stage 105. The substrate 101 may be an exposure mask substrate, or a semiconductor substrate such as a silicon wafer. In the case of the substrate 101 being a semiconductor substrate, a plurality of chip patterns (wafer dies) are formed on the semiconductor substrate. In the case of the substrate 101 being an exposure mask substrate, a chip pattern is formed on the exposure mask substrate. The chip pattern is composed of a plurality of figure patterns. When the chip pattern formed on the exposure mask substrate is exposed/transferred onto the semiconductor substrate a plurality of times, a plurality of chip patterns (wafer dies) are formed on the semiconductor substrate. The case of the substrate 101 being a semiconductor substrate is mainly described below. The substrate 101 is placed, with its pattern-forming surface facing upward, on the stage 105, for example. Further, on the stage 105, there is disposed a mirror 216 which reflects a laser beam for measuring a laser length emitted from a laser length measuring system 122 arranged outside the inspection chamber 103. The multi-detector 222 is connected, at the outside of the electron beam column 102, to a detection circuit 106.

In the control system circuit 160, a control computer 110 which controls the whole of the inspection apparatus 100 is connected, through a bus 120, to a position circuit 107, a comparison circuit 108, a reference image generation circuit 112, a stage control circuit 114, a lens control circuit 124, a blanking control circuit 126, a deflection control circuit 128, a correction amount calculation circuit 130, a sizing processing circuit 132, a storage device 109 such as a magnetic disk drive, a monitor 117, and a memory 118. The deflection control circuit 128 is connected to DAC (digital-to-analog conversion) amplifiers 144, 146 and 148. The DAC amplifier 146 is connected to the main deflector 208, and the DAC amplifier 144 is connected to the sub deflector 209. The DAC amplifier 148 is connected to the deflector 218.

The detection circuit 106 is connected to a chip pattern memory 123. The chip pattern memory 123 is connected to the comparison circuit 108 and the correction amount calculation circuit 130. The stage 105 is driven by a drive mechanism 142 under the control of the stage control circuit 114. In the drive mechanism 142, for example, a drive system such as a three (x-, y-, and θ-) axis motor which provides drive in the directions of x, y, and θ in the stage coordinate system is configured, and the stage 105 can move in the x, y, and θ directions. The stage 105 is movable in the horizontal direction and the rotation direction by the x-, y-, and θ-axis motors. The movement position of the stage 105 is measured by the laser length measuring system 122, and supplied (transmitted) to the position circuit 107. Based on the principle of laser interferometry, the laser length measuring system 122 measures the position of the stage 105 by receiving a reflected light from the mirror 216. In the stage coordinate system, the x, y, and θ directions are set, for example, with respect to a plane perpendicular to the optical axis (center axis of electron trajectory) of the multiple primary electron beams.

The electromagnetic lenses 202, 205, 206, 207 (objective lens), 224 and 226, and the beam separator 214 are controlled by the lens control circuit 124. The bundle blanking deflector 212 is composed of two or more electrodes (or poles), and each electrode is controlled by the blanking control circuit 126 through a DAC amplifier (not shown). The sub deflector 209 is composed of four or more electrodes (or poles), and each electrode is controlled by the deflection control circuit 128 through the DAC amplifier 144. The main deflector 208 is composed of four or more electrodes (or poles), and each electrode is controlled by the deflection control circuit 128 through the DAC amplifier 146. The deflector 218 is composed of four or more electrodes (or poles), and each electrode is controlled by the deflection control circuit 128 through the DAC amplifier 148.

To the electron gun 201, there is connected a high voltage power supply circuit (not shown). The high voltage power supply circuit applies an acceleration voltage between a filament (cathode) and an extraction electrode (anode) (which are not shown) in the electron gun 201. In addition to the applying the acceleration voltage, a voltage is applied to another extraction electrode (Wehnelt), and the cathode is heated to a predetermined temperature, and thereby, electrons from the cathode are accelerated to be emitted as an electron beam 200.

FIG. 1 shows configuration elements necessary for describing the first embodiment. It should be understood that other configuration elements generally necessary for the inspection apparatus 100 may also be included therein.

Figure 2:
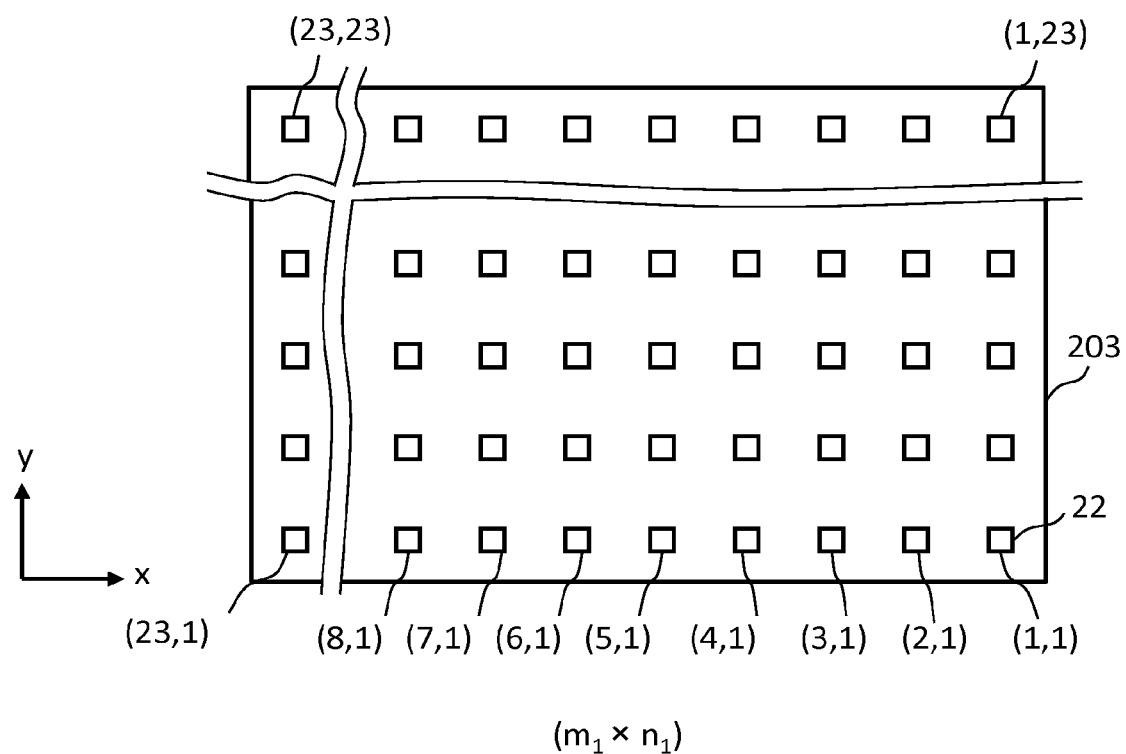
FIG. 2 is a conceptual diagram showing a configuration of a shaping aperture array substrate according to the first embodiment.

FIG. 2 is a conceptual diagram showing a configuration of a shaping aperture array substrate according to the first embodiment. As shown in FIG. 2, holes (openings) 22 of m1 columns wide (width in the x direction) (each column in the y direction) and n1 rows long (length in the y direction) (each row in the x direction) are two-dimensionally formed in the x and y directions at a predetermined arrangement pitch in the shaping aperture array substrate 203, where one of m1 and n1 is an integer of 2 or more, and the other is an integer of 1 or more. In the case of FIG. 2, 23×23 holes (openings) 22 are formed. Ideally, each of the holes 22 is a rectangle (including a square) having the same dimension, shape, and size. Alternatively, ideally, each of the holes 22 may be a circle with the same outer diameter. m1×n1(=N) multiple primary electron beams 20 are formed by letting portions of the electron beam 200 individually pass through a corresponding one of the plurality of holes 22.

Next, operations of the image acquisition mechanism 150 in the inspection apparatus 100 will be described below.

The electron beam 200 emitted from the electron gun 201 (emission source) is refracted by the electromagnetic lens 202, and illuminates the whole of the shaping aperture array substrate 203. As shown in FIG. 2, a plurality of holes 22 (openings) are formed in the shaping aperture array substrate 203. The region including all the plurality of holes 22 is irradiated by the electron beam 200. The multiple primary electron beams 20 are formed by letting portions of the electron beam 200 applied to the positions of the plurality of holes 22 individually pass through a corresponding one of the plurality of holes 22 in the shaping aperture array substrate 203.

The formed multiple primary electron beams 20 are individually refracted by the electromagnetic lenses 205 and 206, and travel to the electromagnetic lens 207 (objective lens), while repeating forming an intermediate image and a crossover, passing through the beam separator 214 disposed at the crossover position of each beam (at the intermediate image position of each beam) of the multiple primary electron beams 20. Then, the electromagnetic lens 207 focuses the multiple primary electron beams 20 onto the substrate 101. The multiple primary electron beams 20 having been focused on the substrate 101 (target object) by the electromagnetic lens 207 (objective lens) are collectively deflected by the main deflector 208 and the sub deflector 209 to irradiate respective beam irradiation positions on the substrate 101. When all of the multiple primary electron beams 20 are collectively deflected by the bundle blanking deflector 212, they deviate from the hole in the center of the limiting aperture substrate 213 and are blocked by the limiting aperture substrate 213. On the other hand, the multiple primary electron beams 20 which were not deflected by the bundle blanking deflector 212 pass through the hole in the center of the limiting aperture substrate 213 as shown in FIG. 1. Blanking control is provided by On/Off of the bundle blanking deflector 212, and thus On/Off of the multiple beams is collectively controlled. In this way, the limiting aperture substrate 213 blocks the multiple primary electron beams 20 which were deflected to be in the "Off" condition" by the bundle blanking deflector 212. Then, the multiple primary electron beams 20 for inspection (for image acquisition) are formed by the beams having been made during a period from becoming "beam On" to becoming "beam Off" and having passed through the limiting aperture substrate 213.

When desired positions on the substrate 101 are irradiated with the multiple primary electron beams 20, a flux of secondary electrons (multiple secondary electron beams 300) including reflected electrons, each corresponding to each of the multiple primary electron beams 20, is emitted from the substrate 101 due to the irradiation with the multiple primary electron beams 20.

The multiple secondary electron beams 300 emitted from the substrate 101 travel to the beam separator 214 through the electromagnetic lens 207.

Here, it is preferable to use, for example, an E×B separator as the beam separator 214. The beam separator (E×B separator) 214 includes a plurality of at least two electrodes (poles) which generate an electric field, and a plurality of at least two magnetic poles, each having a coil, which generate a magnetic field. A pair of opposite electrodes is included in the plurality of electrodes. A pair of opposite magnetic poles is included in the plurality of magnetic poles. The beam separator 214 generates an electric field and a magnetic field to be perpendicular to each other in a plane orthogonal to the traveling direction of the center beam (that is, the electron trajectory center axis) of the multiple primary electron beams 20. The electric field exerts a force in a fixed direction regardless of the traveling direction of electrons. In contrast, the magnetic field exerts a force according to Fleming's left-hand rule. Therefore, the direction of force acting on (applied to) electrons can be changed depending on the entering (or "traveling") direction of electrons. With respect to the multiple primary electron beams 20 entering the beam separator 214 from above, since the forces due to the electric field and the magnetic field cancel each other out, the beams 20 travel straight downward. In contrast, with respect to the multiple secondary electron beams 300 entering the beam separator 214 from below, since both the forces due to the electric field and the magnetic field are exerted in the same direction, the beams 300 are bent obliquely upward, and separated from the multiple primary electron beams 20.

The multiple secondary electron beams 300 having been bent obliquely upward and separated from the multiple primary electron beams 20 are further bent by the deflector 218, and projected onto the multi-detector 222 while being refracted by the electromagnetic lenses 224 and 226. The multi-detector 222 detects secondary electrons emitted from the substrate 101 due to the irradiation of the multiple primary electron beams 20. Specifically, the multi-detector 222 detects the projected multiple secondary electron beams 300. Onto the multi-detector 222, reflected electrons and secondary electrons may be projected, or it is also acceptable that reflected electrons are emitted along the way and remaining secondary electrons are projected. The multi-detector 222 includes a two-dimensional sensor. Then, each secondary electron of the multiple secondary electron beams 300 collides with a corresponding region of the two-dimensional sensor, thereby generating an electron, and secondary electron image data is generated for each pixel. In other words, in the multi-detector 222, a detection sensor is disposed for each primary electron beam of the multiple primary electron beams 20. Then, the detection sensor detects a corresponding secondary electron beam emitted by irradiation with each primary electron beam. Therefore, each of a plurality of detection sensors in the multi-detector 222 detects an intensity signal of a secondary electron beam for an image resulting from irradiation with an associated corresponding primary electron beam. The intensity signal detected by the multi-detector 222 is output to the detection circuit 106.

Figure 3:
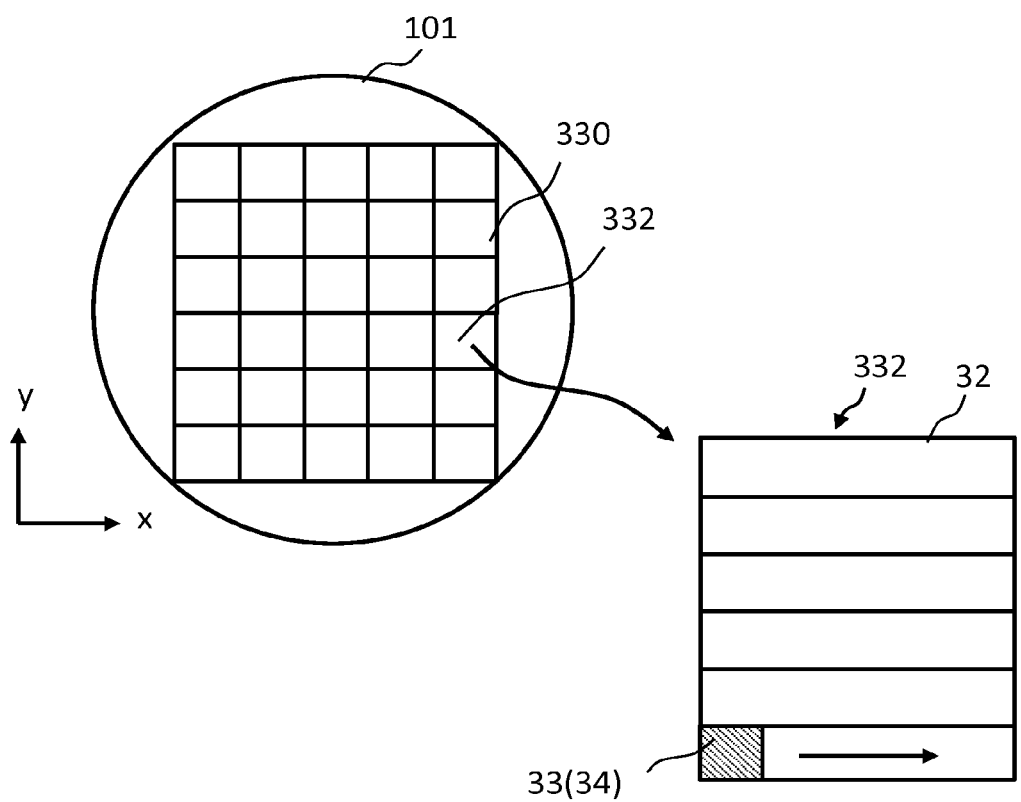
FIG. 3 is an illustration showing an example of a plurality of chip regions formed on a semiconductor substrate, according to the first embodiment.

FIG. 3 is an illustration showing an example of a plurality of chip regions formed on a semiconductor substrate, according to the first embodiment. In FIG. 3, in the case of the substrate 101 being a semiconductor substrate (wafer), a plurality of chips (wafer dies) 332 are formed in a two-dimensional array in an inspection region 330 of the semiconductor substrate (wafer). With respect to each chip 332, a mask pattern for one chip formed on an exposure mask substrate is reduced to, for example, ¼, and exposed/transferred onto each chip 332 by an exposure device such as a stepper and a scanner (not shown). For example, the region of each chip 332 is divided in the y direction into a plurality of stripe regions 32 by a predetermined width. The scanning operation by the image acquisition mechanism 150 is carried out for each stripe region 32, for example. The operation of scanning the stripe region 32 advances relatively in the x direction while the stage 105 is moved in the −x direction, for example. Each stripe region 32 is divided in the longitudinal direction into a plurality of rectangular (including square) regions 33. Beam application to a target rectangular region 33 is achieved by collectively deflecting all the multiple primary electron beams 20 by the main deflector 208.

Figure 4:
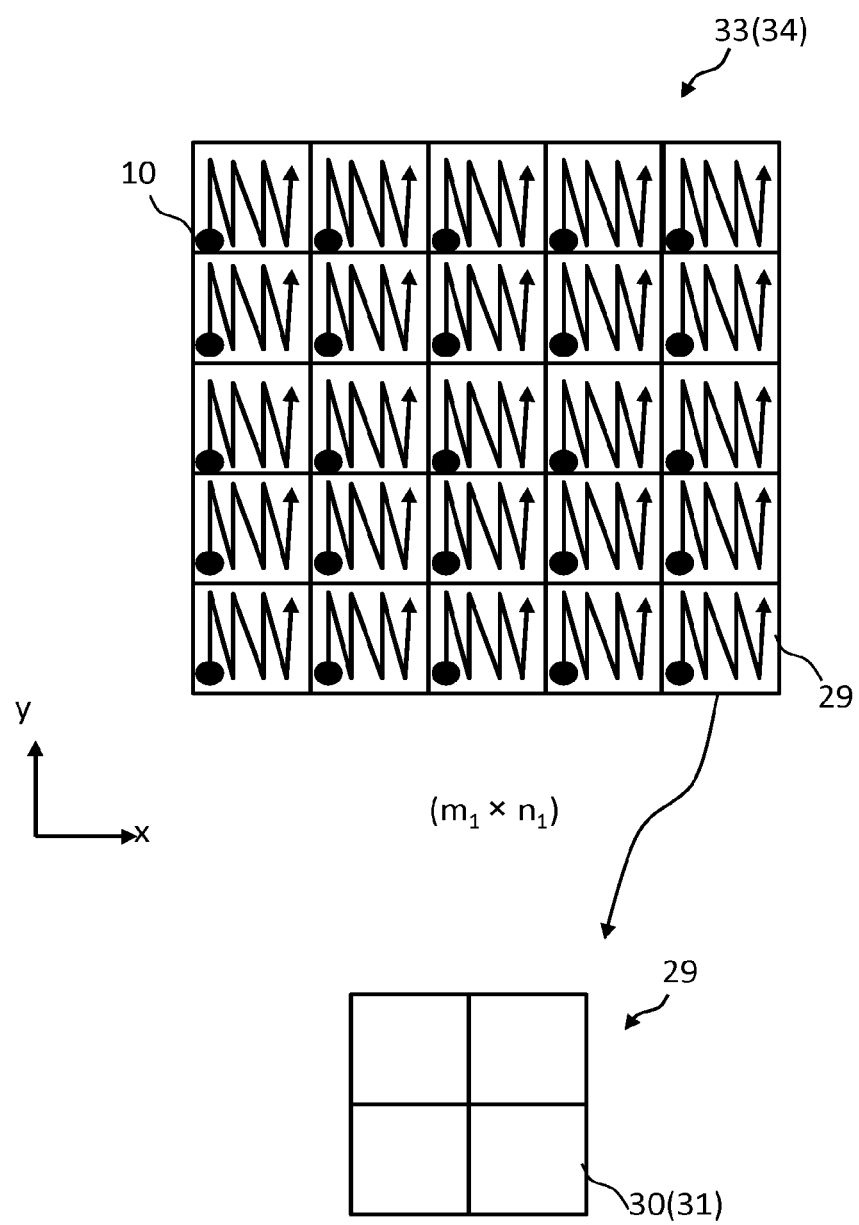
FIG. 4 is an illustration for explaining a scanning operation with multiple beams according to the first embodiment.

FIG. 4 is an illustration for explaining a scanning operation with multiple beams according to the first embodiment. FIG. 4 shows the case of the multiple primary electron beams 20 of 5 rows×5 columns. The size of an irradiation region 34 which can be irradiated by one irradiation with the multiple primary electron beams 20 is defined by (x direction size obtained by multiplying a beam pitch in the x direction of the multiple primary electron beams 20 on the substrate 101 by the number of beams in the x direction)×(y direction size obtained by multiplying a beam pitch in the y direction of the multiple primary electron beams 20 on the substrate 101 by the number of beams in the y direction). Preferably, the width of each stripe region 32 is set to be the same as the size in the y direction of the irradiation region 34, or to be the size reduced by the width of the scanning margin. In the case of FIG. 4, the irradiation region 34 and the rectangular region 33 are of the same size. However, it is not limited thereto. The irradiation region 34 may be smaller than the rectangular region 33, or larger than it. A sub-irradiation region 29, which is surrounded by the beam pitch in the x direction and the beam pitch in the y direction and in which the beam concerned itself is located, is irradiated and scanned with each beam of the multiple primary electron beams 20. Each primary electron beam 10 of the multiple primary electron beams 20 is associated with any one of the sub-irradiation regions 29 which are different from each other. At the time of each shot, each primary electron beam 10 is applied to the same position in the associated sub-irradiation region 29. The primary electron beam 10 is moved in the sub-irradiation region 29 by collective deflection of all the multiple primary electron beams 20 by the sub deflector 209. By repeating this operation, the inside of one sub-irradiation region 29 is irradiated with one primary electron beam 10 in order. Then, when scanning of one sub-irradiation region 29 is completed, the irradiation position is moved to an adjacent rectangular region 33 in the same stripe region 32 by collectively deflecting all of the multiple primary electron beams 20 by the main deflector 208. By repeating this operation, the inside of the stripe region 32 is irradiated in order. After completing scanning of one stripe region 32, the irradiation position is moved to the next stripe region 32 by moving the stage 105 and/or by collectively deflecting all of the multiple primary electron beams 20 by the main deflector 208. As described above, a secondary electron image of each sub-irradiation region 29 is acquired by irradiation with each primary electron beam 10. By combining secondary electron images of respective sub-irradiation regions 29, a secondary electron image of the rectangular region 33, a secondary electron image of the stripe region 32, or a secondary electron image of the chip 332 is configured.

As shown in FIG. 4, each sub-irradiation region 29 is divided into a plurality of rectangular frame regions 30, and a secondary electron image to be inspected (inspection image) in units of frame regions 30 is used for inspection. In the example of FIG. 4, one sub-irradiation region 29 is divided into four frame regions 30, for example. However, the number used for the dividing is not limited to four, and other number may be used.

It is also preferable to group, for example, a plurality of chips 332 aligned in the x direction in the same group, and to divide each group into a plurality of stripe regions 32 by a predetermined width in the y direction, for example. Then, moving between stripe regions 32 is not limited to the moving in each chip 332, and it is also preferable to move in each group.

When the multiple primary electron beams 20 irradiate the substrate 101 while the stage 105 is continuously moving, the main deflector 208 executes a tracking operation by performing collective deflection so that the irradiation position of the multiple primary electron beams 20 may follow the movement of the stage 105. Therefore, the emission position of the multiple secondary electron beams 300 changes every second with respect to the trajectory central axis of the multiple primary electron beams 20. Similarly, when the inside of the sub-irradiation region 29 is scanned, the emission position of each secondary electron beam changes every second in the sub-irradiation region 29. Thus, the deflector 218 collectively deflects the multiple secondary electron beams 300 so that each secondary electron beam whose emission position has changed as described above may be applied to a corresponding detection region of the multi-detector 222.

According to the first embodiment, in advance of inspection processing, a uniform sizing amount and a line-width dependent correction amount are calculated. The uniform sizing amount is used for uniformly resizing the line width of a design pattern regardless of the size of the line width, and the line-width dependent correction amount is used for correcting an error, which depends on the line width size, between the line width of a figure pattern obtained by performing image development on a design pattern having been uniformly sized and the line width of a figure pattern of a measurement image (secondary electron image). An evaluation substrate is used for obtaining the uniform sizing amount and the line-width dependent correction amount. On the evaluation substrate, a plurality of figure patterns for evaluation (evaluation figure patterns) having different line-width sizes are formed. For example, a plurality of evaluation figure patterns with line widths 100 nm, 80 nm, 60 nm, 30 nm, and 20 nm are formed. Design pattern data for evaluation (evaluation design pattern data) being the basis of the plurality of evaluation figure patterns formed on the evaluation substrate is stored in the magnetic disk drive 109.

The image acquisition mechanism 150 places an evaluation substrate on the stage 105, and acquires secondary electron images (measurement images for evaluation, evaluation measurement images) of a plurality of evaluation figure patterns formed on the evaluation substrate.

First, the image acquisition mechanism 150 moves the stage 105 to the position where it is possible to scan the stripe region 32 including a region in which at least one of the plurality of the evaluation figure patterns on the evaluation substrate is formed. Then, the image acquisition mechanism 150 acquires an image of this stripe region 32. Here, for example, by applying the multiple primary electron beams 20 to the stripe region 32 on the evaluation substrate, and detecting the multiple secondary electron beams 300 emitted from the substrate 101 due to the application (irradiation) of the multiple primary electron beams 20, the image acquisition mechanism 150 acquires a secondary electron image (evaluation measurement image) of the stripe region 32 including a region in which at least one of the plurality of the evaluation figure patterns is formed. When the plurality of evaluation figure patterns are formed in a plurality of stripe regions, a secondary electron image (evaluation measurement image) of each stripe region, in which any one of the plurality of evaluation figure patterns is formed, is acquired. As described above, onto the multi-detector 222, reflected electrons and secondary electrons may be projected, or it is also acceptable that reflected electrons are emitted along the way and remaining secondary electrons (multiple secondary electron beams 300) are projected.

As described above, the multiple secondary electron beams 300 emitted from the substrate 101 due to irradiation with the multiple primary electron beams 20 are detected by the multi-detector 222. Detection data (measurement image data: secondary electron image data: inspection image data) on a secondary electron of each pixel in each sub-irradiation region 29, detected by the multi-detector 222, is output to the detection circuit 106 in order of measurement. The detection data in an analog form is converted into digital data by an A-D converter (not shown) in the detection circuit 106, and stored in the chip pattern memory 123. Then, acquired measurement image data for evaluation (evaluation measurement image data) is transmitted to the comparison circuit 108, together with information on each position from the position circuit 107.

The reference image generation unit 112 generates a reference image for evaluation (evaluation reference image) which is corresponding to a measurement image for evaluation (hereinafter called an evaluation measurement image) of a plurality of evaluation figure patterns, by performing image development on evaluation design pattern data being the basis for forming a plurality of evaluation figure patterns of the evaluation substrate. Specifically, the reference image generation unit 112 reads evaluation design pattern data from the magnetic disk device 109 through the control computer 110, and converts (image development) each figure pattern in a corresponding frame region defined by the read evaluation design pattern data into image data in binary or multiple values so as to generate an evaluation design image.

Here, basic figures defined by evaluation design pattern data are, for example, rectangles (including squares) and triangles. For example, figure data (vector data) is stored which defines the shape, size, position, and the like of each pattern figure by using information, such as coordinates (x, y) of the reference position of the figure, lengths of sides of the figure, and a figure code serving as an identifier for identifying the figure type such as rectangles, triangles and the like.

The reference image generation circuit 112 develops the data into data for each figure, and interprets a figure code, figure dimensions, and the like indicating the figure shape of the figure data. Then, the reference image generation circuit 112 develops the data to design pattern image data in binary or multiple values as a pattern to be arranged in squares in units of grids of predetermined quantization dimensions, and outputs the developed data. In other words, the reference image generation circuit 112 reads design data, calculates the occupancy of a figure in a design pattern, for each square region obtained by virtually dividing the inspection region into squares in units of predetermined dimensions, and outputs n-bit occupancy data. For example, it is preferable to set one square as one pixel. Assuming that one pixel has a resolution of $1/2^8(=1/256)$, the occupancy rate in each pixel is calculated by allocating sub regions each being $1/256$ to the region of a figure arranged in the pixel. Then, an evaluation design image of 8-bit occupancy data is generated for each pixel.

Next, the reference image generation circuit 112 generates an evaluation reference image corresponding to a target evaluation measurement image by performing filtering processing on an evaluation design image corresponding to the target evaluation measurement image by using a predetermined image processing filter. Thereby, it becomes possible to match/fit evaluation design image data being design side image data, whose image intensity (gray scale level) is represented by digital values, with image generation characteristics obtained by irradiation with the multiple primary electron beams 20. Image data of the generated evaluation reference image is output to the comparison circuit 108.

Figure 5:
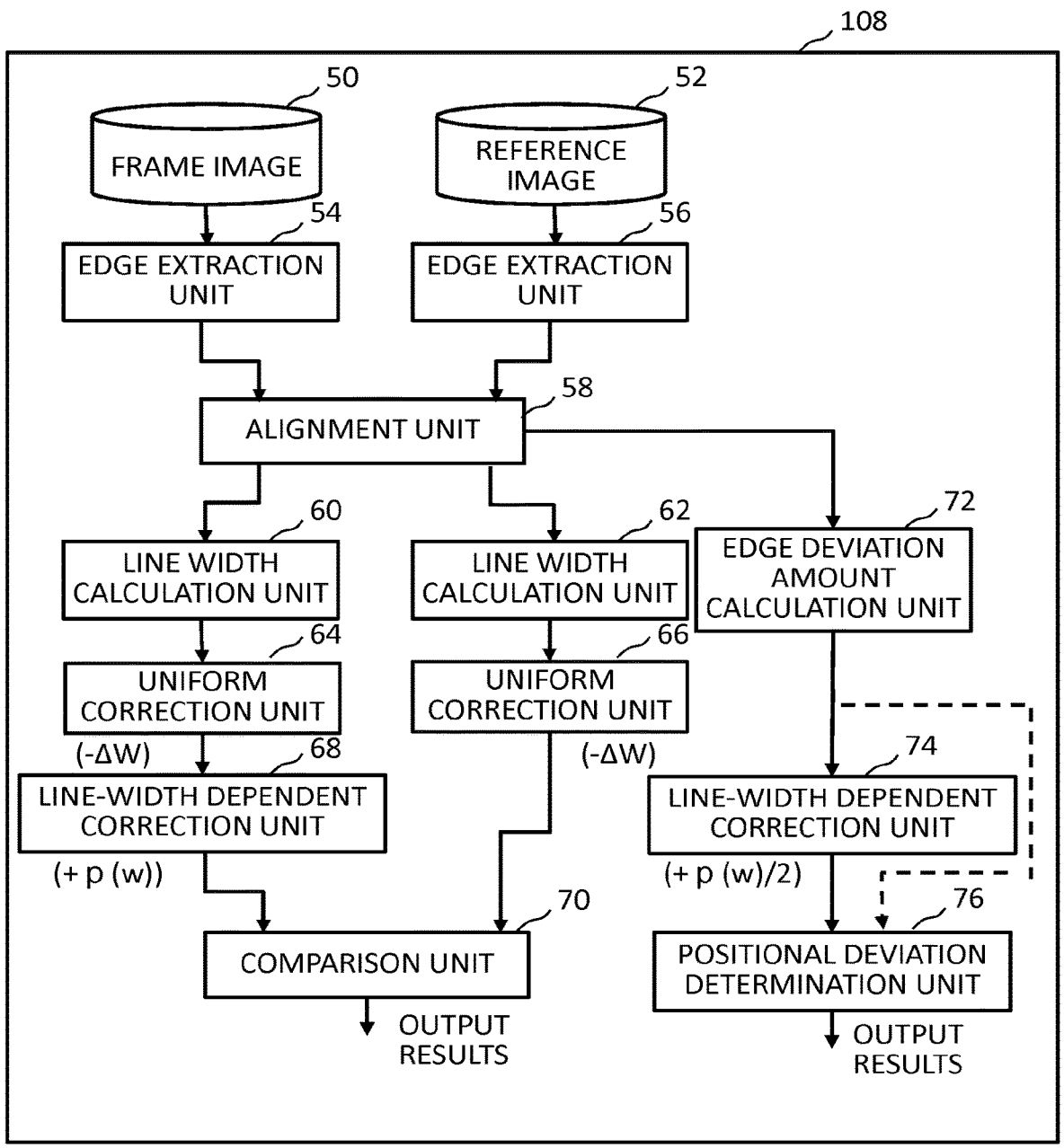
FIG. 5 is a block diagram showing an example of an internal configuration of a comparison circuit according to the first embodiment.

FIG. 5 is a block diagram showing an example of an internal configuration of a comparison circuit according to the first embodiment. As shown in FIG. 5, in the comparison circuit 108, there are arranged storage devices 50 and 52 such as a magnetic disk drive, edge extraction units 54 and 56, an alignment unit 58, line width calculation units 60 and 62, uniform correction units 64 and 66, a line-width dependent correction unit 68, a comparison unit 70, an edge deviation amount calculation unit 72, a line-width dependent correction unit 74, and a positional deviation determination unit 76. Each " . . . unit", such as the edge extraction units 54 and 56, the alignment unit 58, the line width calculation units 60 and 62, the uniform correction units 64 and 66, the line-width dependent correction unit 68, the comparison unit 70, the edge deviation amount calculation unit 72, the line-width dependent correction unit 74, and the positional deviation determination unit 76 includes processing circuitry. The processing circuitry includes an electric circuit, a computer, a processor, a circuit board, a quantum circuit, a semiconductor device, or the like. Further, common processing circuitry (the same processing circuitry), or different processing circuitry (separate processing circuitry) may be used for each " . . . unit". Input data necessary for the edge extraction units 54 and 56, the alignment unit 58, the line width calculation units 60 and 62, the uniform correction units 64 and 66, the line-width dependent correction unit 68, the comparison unit 70, the edge deviation amount calculation unit 72, the line-width dependent correction unit 74, and the positional deviation determination unit 76, and operated (calculated) results are stored in a memory (not shown) or in the memory 118 each time.

Data of the evaluation measurement image input in the comparison circuit 108 is stored in the storage device 50. Further, data of the evaluation reference image input in the comparison circuit 108 is stored in the storage device 52. In the first embodiment, a secondary electron image for each frame region 30 is used, for example. The sub-irradiation region 29 is divided into four frame regions 30, for example. As the frame region 30, a region of 512×512 pixels is used, for example.

The edge extraction unit 54 extracts an edge (outline, contour) of each of a plurality of evaluation figure patterns in the evaluation measurement image (evaluation frame image) of each frame region 30. The edge extraction unit 56 extracts an edge (outline, contour) of each of a plurality of evaluation figure patterns in the evaluation reference image of each frame region 30. The edge extraction method may be the same as the conventional one. For example, it is preferable to extract, as the edge position, the maximum gradient position of a signal intensity (gray scale level) profile of an image. In other words, it is preferable to extract, for each sub-pixel, a position where a differential intensity is the maximum, which is obtained by filtering processing on an image with a differentiation filter.

Although, in the example described above, each edge is extracted from the reference image obtained by performing image development on design pattern data, it is not limited thereto. Edges (outlines, contours) of a plurality of evaluation figure patterns may be extracted from data of evaluation design patterns arranged in each frame region 30 before image development.

The alignment unit 58 aligns each edge position extracted from the evaluation frame image with each edge position extracted from the evaluation reference image. For example, it is preferable to align each other the positions at each of which the differential intensity is the maximum.

The line width calculation unit 60 obtains a width between paired edges extracted from the evaluation frame image, as a measurement line width of the evaluation figure pattern. Similarly, the line width calculation unit 62 obtains a width between paired edges extracted from the evaluation reference image, as a design line width of the evaluation figure pattern. Line width data on the calculated measurement line width and design line width of a plurality of evaluation figure patterns having different line width sizes is output to the correction amount calculation circuit 130. It is also acceptable to output, to the correction amount calculation circuit 130, line width data obtained after, in the comparison circuit 108, setting the uniform sizing amount and the line-width dependent correction amount to zero and executing each processing, to be described later, of the uniform correction units 64 and 66, and the line-width dependent correction unit 68.

Figure 6:
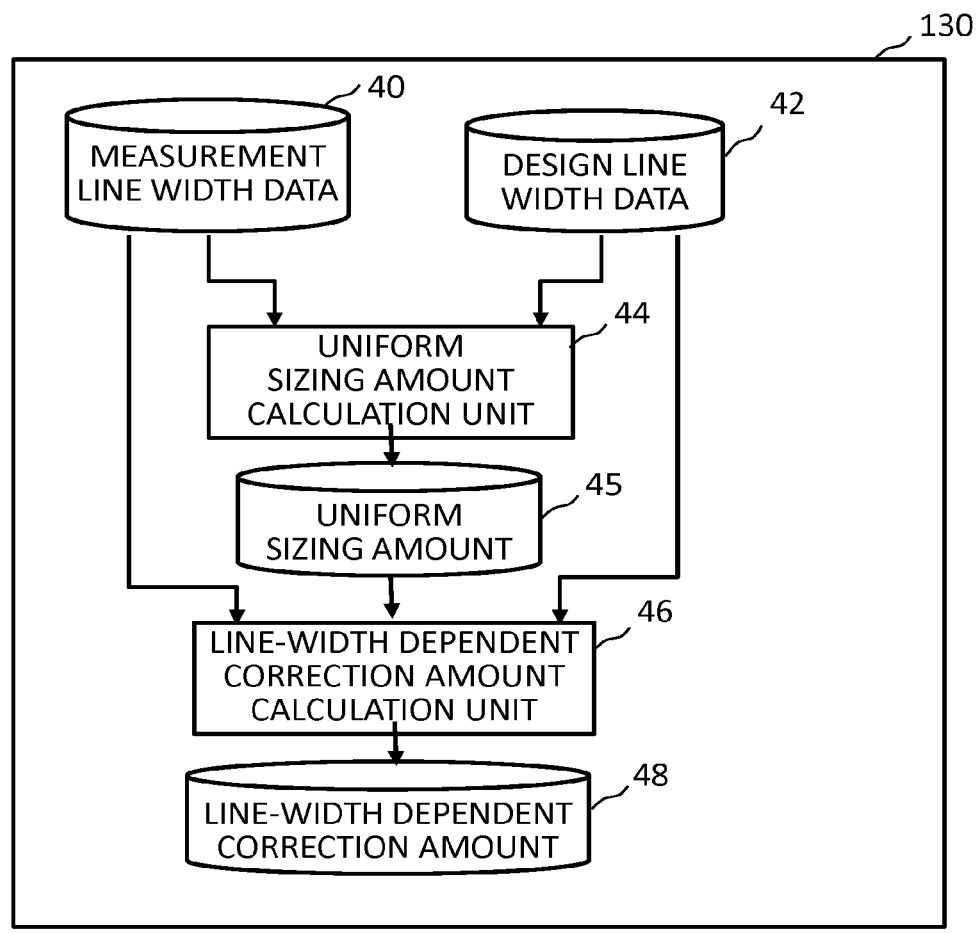
FIG. 6 is a block diagram showing an example of an internal configuration of a correction amount calculation circuit according to the first embodiment.

FIG. 6 is a block diagram showing an example of an internal configuration of a correction amount calculation circuit according to the first embodiment. As shown in FIG. 6, in the correction amount calculation circuit 130, there are arranged storage devices 40, 42, 45, and 48 such as a magnetic disk drive, a uniform sizing amount calculation unit 44, and a line-width dependent correction amount calculation unit 46. Each " . . . unit", such as the uniform sizing amount calculation unit 44 and the line-width dependent correction amount calculation unit 46 includes processing circuitry. The processing circuitry includes an electric circuit, a computer, a processor, a circuit board, a quantum circuit, a semiconductor device, or the like. Further, common processing circuitry (the same processing circuitry), or different processing circuitry (separate processing circuitry) may be used for each " . . . unit". Input data necessary for the uniform sizing amount calculation unit 44 and the line-width dependent correction amount calculation unit 46, and operated (calculated) results are stored in a memory (not shown) or in the memory 118 each time.

Measurement line width data input to the correction amount calculation circuit 130 is stored in the storage device 40. Reference line width data is stored in the storage device 42.

The uniform sizing amount calculation unit 44 calculates a uniform sizing amount ΔW for uniformly resizing the line width of the design pattern, which is the basis of a figure pattern formed on the inspection substrate, regardless of the line width size.

Figure 7A:
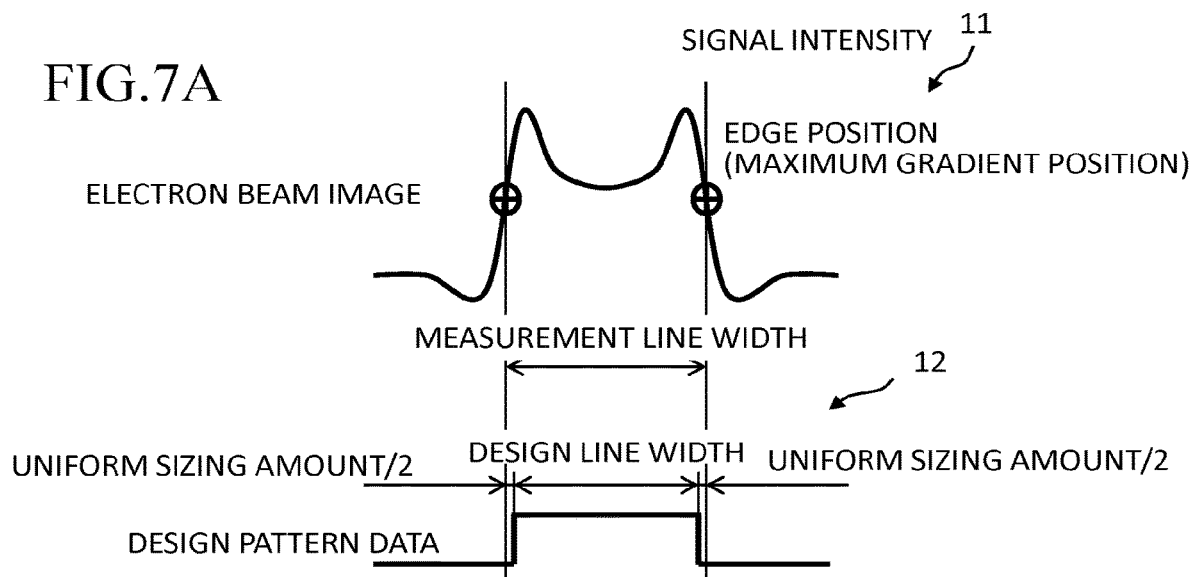
FIGS. 7A and 7B are illustrations showing an example of a profile of a measurement image having a reference line width, design pattern data of the reference line width, and design pattern data after uniformly sizing according to the first embodiment.
Figure 7B:
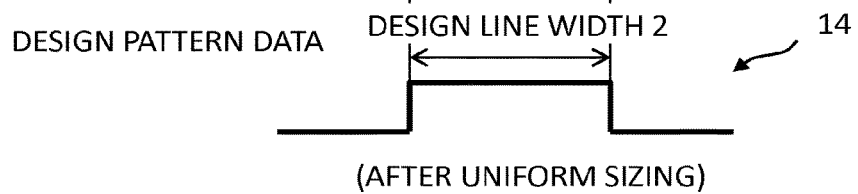

FIGS. 7A and 7B are illustrations showing an example of a profile of a measurement image having a reference line width, design pattern data of the reference line width, and design pattern data after uniformly sizing according to the first embodiment. FIG. 7A shows a gray scale profile of a figure pattern 11 having a reference line width of a measurement image, and shape data of the design pattern having the reference line width. In FIG. 7A, shape data of an evaluation design pattern 12 before image development is shown instead of image data of an evaluation design pattern in an evaluation reference image. The line width of the evaluation design pattern in the evaluation reference image is substantially the same as the line width of the evaluation design pattern data before image development. In the first embodiment, the reference line width is set in advance. For example, the line width of an anchor pattern is set as the reference line width. Alternatively, preferably, the line width of a figure pattern which is formed many times among a plurality of figure patterns on the inspection substrate is set as the reference line width, for example. It is preferable to form a plurality of evaluation figure patterns, having different line width sizes including a reference line width to be set, on the evaluation substrate. For example, in a plurality of evaluation figure patterns having line widths of 100 nm, 80 nm, 60 nm, 30 nm, and 20 nm formed on the evaluation substrate, for example, 100 nm is set as the reference line width.

Using an evaluation substrate on which a figure pattern having a reference line width size is arranged, the uniform sizing amount calculation unit 44 calculates, as the uniform sizing amount ΔW, a difference between the line width of the figure pattern 11 in an evaluation frame image (secondary electron image) which is acquired from the evaluation substrate, and the line width of a figure pattern with a reference size in the evaluation reference image corresponding to the evaluation frame image (secondary electron image) acquired from the evaluation substrate. Alternatively, using an evaluation substrate on which a figure pattern having a reference line width size is arranged, the uniform sizing amount calculation unit 44 may calculate, as the uniform sizing amount ΔW, a difference between the line width of the figure pattern 11 in an evaluation frame image (secondary electron image) which is acquired from the evaluation substrate, and the line width of the design pattern 12 having a reference size in the frame region corresponding to the evaluation frame image (secondary electron image) acquired from the evaluation substrate. If the uniform sizing amount is added to the line width of the design pattern with the reference line width, as shown in FIG. 7B, the line width (design line width 2) of the design pattern 14 after the addition can be matched with the measurement line width of the reference line width.

The calculated uniform sizing amount ΔW is stored in the storage device 45.

Further, when calculating a uniform sizing amount, it is also preferable to calculate, as the uniform sizing amount, a statistic value such as an average, the maximum, the minimum, or the median of a plurality of results obtained from a plurality of figure patterns 11 each having a reference line width size, not determining based on a result obtained from one figure pattern 11 having a reference line width size.

Although the above case describes setting one line width size (here, 100 nm) as the reference line width, it is not limited thereto. For example, a plurality of line width sizes such as 100 nm and 80 nm may be set as the reference line width. In that case, a statistic value such as an average between the uniform sizing amount in the case of 100 nm and that in the case of 80 nm may be set as the uniform sizing amount.

FIGS. 8A and 8B are illustrations showing an example of a profile of a measurement image having a line width other than a reference line width, design pattern data of the line width other than the reference line width, and design pattern data after uniformly sizing according to the first embodiment. FIG. 8A shows a gray scale profile of a figure pattern with a line width other than the reference line width of a measurement image, and shape data of a design pattern with a line width other than the reference line width. FIG. 8A shows an evaluation figure pattern of a line width 60 nm in the case of the reference line width being 100 nm. FIG. 8A shows the case where the line width (measurement line width) of the figure pattern of 60 nm of a measurement image is 60 nm, and therefore is coincident with the line width of the design pattern. However, if, regardless of the size of the line width, the uniform sizing amount is added to the line width of the design pattern, the line width (design line width 2) of the design pattern after the addition is, for example, 61 nm and deviates from the measurement line width as shown in FIG. 8B. Although FIG. 8A shows the line width of 60 nm in the case of the reference line width being 100 nm, an error depending on the line width size also occurs even when other line width size is used.

Then, the line-width dependent correction amount calculation unit 46 calculates a line-width dependent correction amount p(w) for correcting an error, which depends on the line width size, between the line width of a figure pattern obtained by performing image development on a design pattern having been uniformly sized and the line width of a figure pattern of a measurement image (secondary electron image).

Using an evaluation substrate on which a plurality of figure patterns having different line width sizes are arranged, the line-width dependent correction amount calculation unit 46 calculates, as a correction amount depending on a line width size (that is, line-width dependent correction amount p(w)), a difference between the line width of each of a plurality of figure patterns corresponding to each of line width sizes in a secondary electron image acquired from the evaluation, and the line width of each of a plurality of figure patterns corresponding to each of line width sizes in one or more reference images acquired by performing image development on data of a plurality of design patterns which are obtained by resizing a plurality of design patterns being the basis of the plurality of figure patterns in the secondary electron image by using a uniform sizing amount. With respect to a line width size not existing on the evaluation substrate, a value obtained by a linear interpolation using a difference between two or more line width sizes is calculated. In the case of FIG. 8A, if the uniform sizing amount is 1 nm, the line width of the design pattern after the addition is 61 nm. Therefore, in order to be matched with the measurement line width 60 nm, the line-width dependent correction amount to be subtracted from the line width of the design pattern after the addition is 1 nm.

Alternatively, using an evaluation substrate on which a plurality of figure patterns having different line width sizes are arranged, the line-width dependent correction amount calculation unit 46 may calculate, as a correction amount depending on a line width size (that is, line-width dependent correction amount p(w)), a difference between the line width of each of a plurality of figure patterns corresponding to each of line width sizes in a secondary electron image acquired from the evaluation substrate, and the line width of each of a plurality of design patterns before image development acquired by resizing a plurality of design patterns being the basis of a plurality of figure patterns in the secondary electron image by using a uniform sizing amount. Also in this case, with respect to a line width size not existing on the evaluation substrate, a value obtained by a linear interpolation using a difference between two or more line width sizes is calculated.

The calculated line-width dependent correction amount p(w) is stored in the storage device 48.

FIG. 9 is a table showing examples of a uniform sizing amount and a line-width dependent correction amount for each line width size according to the first embodiment. In the case of FIG. 9, concerning the line width 100 nm which is a reference line width, since the measurement line width is 101 nm, the uniform sizing amount being a difference from the design line width 100 nm is 1 nm, and therefore the line-width dependent correction amount is 0 (zero). Concerning the line width 80 nm, since the measurement line width is 81 nm and the uniform sizing amount is 1 nm, the design line width 2 after addition is equal to the measurement line width, and therefore the line-width dependent correction amount is 0 (zero). Concerning the line width 60 nm, since the measurement line width is 60 nm and the uniform sizing amount is 1 nm, the design line width 2 after addition is 61 nm, and therefore the line-width dependent correction amount to be subtracted from the design line width 2 in order to make the design line width 2 equal to the measurement line width is 1 nm. Concerning the line width 30 nm, since the measurement line width is 29 nm and the uniform sizing amount is 1 nm, the design line width 2 after addition is 31 nm, and therefore the line-width dependent correction amount to be subtracted from the design line width 2 in order to make the design line width 2 equal to the measurement line width is 2 nm. Concerning the line width 20 nm, since the measurement line width is 18 nm and the uniform sizing amount is 1 nm, the design line width 2 after addition is 21 nm, and therefore the line-width dependent correction amount to be subtracted from the design line width 2 in order to make the design line width 2 equal to the measurement line width is 3 nm.

Figure 10:
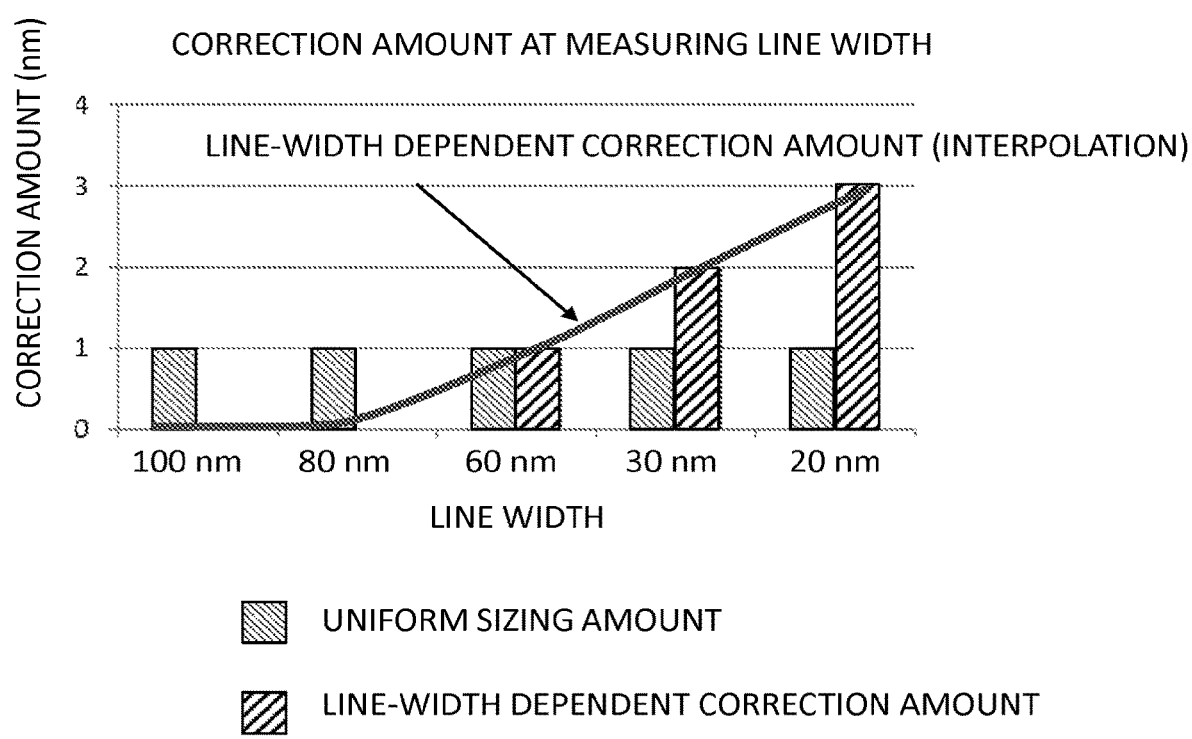
FIG. 10 is a graph showing an example of a correction amount at the time of measuring a line width according to the first embodiment.

FIG. 10 is a graph showing an example of a correction amount at the time of measuring a line width according to the first embodiment. FIG. 10 shows, for each line width size, a uniform sizing amount and a line-width dependent correction amount. As shown in FIG. 10, as the line width size becomes away from the reference line width, the line-width dependent correction amount becomes larger. FIG. 10 shows the case where the line-width dependent correction amount becomes larger as the line width size becomes smaller compared to the reference line width. As described above, with respect to the line-width dependent correction amount for a line width size not existing on the evaluation substrate, a value obtained by a linear interpolation using the line-width dependent correction amount for two or more line width sizes may be used.

As described above, the uniform sizing amount and the line-width dependent correction amounts for a plurality of line width sizes are obtained in advance and stored in the storage device. After that, actual inspection processing for an inspection target substrate 101 is started.

Figure 11:
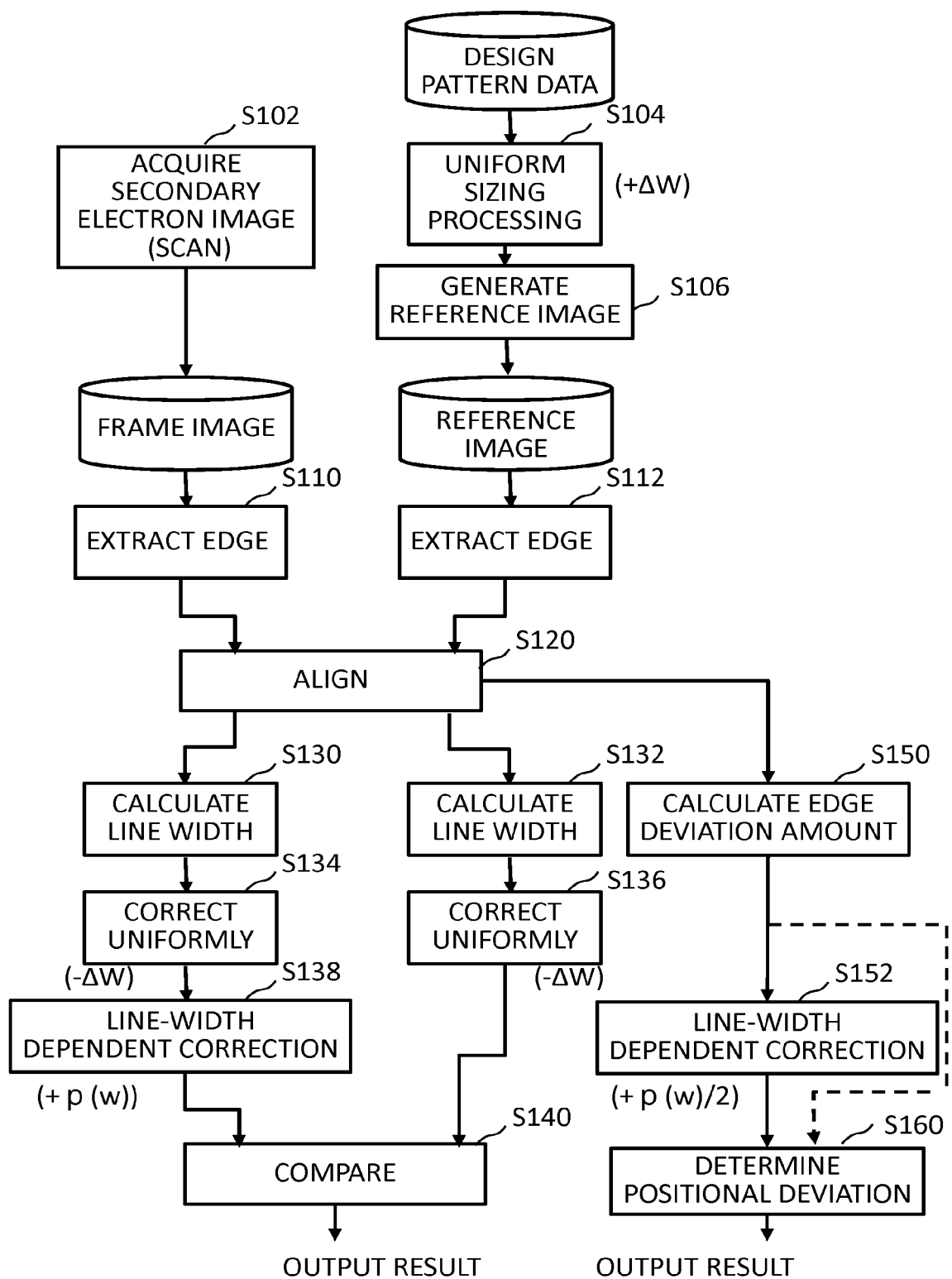
FIG. 11 is a flowchart showing an example of main steps of an inspection method according to the first embodiment.

FIG. 11 is a flowchart showing an example of main steps of an inspection method according to the first embodiment. In FIG. 11, the inspection method of the first embodiment executes a series of steps: a secondary electron image acquisition step (scanning step) (S102), a uniform sizing processing step (S104), a reference image generation step (S106), an edge extraction step (S110), an edge extraction step (S112), an alignment step (S120), a line width calculation step (S130), a line width calculation step (S132), a uniform correction step (S134), a uniform correction step (S136), a line-width dependent correction step (S138), a comparison step (S140), an edge deviation amount calculation step (S150), a line-width dependent correction step (S152), and a positional deviation determination step (S160).

If an edge positional deviation inspection is not performed although a line width inspection is executed, the edge deviation amount calculation step (S150), the line-width dependent correction step (S152), and the positional deviation determination step (S160) may be omitted. Conversely, if a line width inspection is not performed although an edge positional deviation inspection is executed, the line width calculation steps (S130) and (S132), the uniform correction steps (S134) and (S136), the line-width dependent correction step (S138), and the comparison step (S140) may be omitted.

In the secondary electron image acquisition step (scanning step) (S102), the secondary electron image acquisition mechanism 150 acquires a measurement image (secondary electron image) of a figure pattern formed on the substrate 101. Specifically, the secondary electron image acquisition mechanism 150 acquires an electron optical image (secondary electron image) by scanning the substrate 101, on which a plurality of figure patterns are formed, with electron beams. Here, the substrate 101 with a plurality of figure patterns formed thereon is irradiated with the multiple primary electron beams 20 to acquire a secondary electron image of the substrate 101 by detecting the multiple secondary electron beams 300 emitted from the substrate 101 due to the irradiation with the multiple primary electron beams 20. As described above, reflected electrons and secondary electrons may be projected on the multi-detector 222, or alternatively, after reflected electrons having been emitted along the way, only remaining secondary electrons (the multiple secondary electron beams 300) may be projected thereon.

As described above, the multiple secondary electron beams 300 emitted from the substrate 101 due to irradiation with the multiple primary electron beams 20 are detected by the multi-detector 222. Detection data (measurement image data: secondary electron image data: inspection image data: electron optical image data) on a secondary electron of each pixel in each sub-irradiation region 29, detected by the multi-detector 222, is output to the detection circuit 106 in order of measurement. The detection data in an analog form is converted into digital data by an A-D converter (not shown) in the detection circuit 106, and stored in the chip pattern memory 123. Then, acquired measurement image data is transmitted to the comparison circuit 108, together with information on each position from the position circuit 107.

In the uniform sizing processing step (S104), the sizing processing circuit 132 (uniform sizing processing unit) resizes (performs uniform sizing processing) the line width of a design pattern being the basis of a figure pattern by using a uniform sizing amount which has been set in advance. Data of a plurality of design patterns being the basis of a plurality of figure patterns formed on the substrate 101 is stored in the storage device 109. The sizing processing circuit 132 reads target design pattern data from the storage device 109, and performs resizing by adding the uniform sizing amount ΔW to the line width of the design pattern before image development, as shown in FIG. 7A. Specifically, the sizing processing circuit 132 performs resizing uniformly regardless of the line width size by adding ½ of the uniform sizing amount to each of both the ends of the design pattern before image development. Thus, with respect to the reference line width as shown in FIG. 7B, the design line width 2 of the design pattern after resizing is coincident with the measurement line width. However, with respect to a figure pattern having a line width size different from the reference line width, as shown in FIG. 8B, the design line width 2 of the design pattern after resizing deviates from the measurement line width. For example, with respect to a figure pattern with a line width of 60 nm, the design line width 2 of the design pattern after resizing is larger than the measurement line width by 1 nm. Also with respect to other figure patterns each having a line width size different from the reference line width, the design line width 2 of the design pattern after resizing may deviate from the measurement line width.

In the reference image generation step (S106), the reference image generation circuit 112 (reference image generation unit) generates a reference image corresponding to a secondary electron image by performing image development on the data of the design pattern whose line width has been resized. As described above, the reference image generation circuit 112 reads design pattern data from the storage device 109 through the control computer 110, and converts each figure pattern defined by the read design pattern data into image data in binary or multiple values.

As described above, basic figures defined by design pattern data are, for example, rectangles (including squares) and triangles. For example, figure data is stored which defines the shape, size, position, and the like of each pattern figure by using information, such as coordinates (x, y) of the reference position of the figure, lengths of sides of the figure, and a figure code serving as an identifier for identifying the figure type such as rectangles, triangles and the like.

The reference image generation circuit 112 develops, for each frame region 30, for example, the data into data for each figure, and interprets a figure code, figure dimensions, and the like indicating the figure shape of the figure data. Then, the reference image generation circuit 112 develops each figure data to design pattern image data in binary or multiple values as a pattern to be arranged in squares in units of grids of predetermined quantization dimensions, and outputs the developed data. In other words, the reference image generation circuit 112 reads design data, calculates the occupancy of a figure in a design pattern, for each square region obtained by virtually dividing the inspection region into squares in units of predetermined dimensions, and outputs n-bit occupancy data. For example, it is preferable to set one square as one pixel. Assuming that one pixel has a resolution of $1/2^8(=1/256)$, the occupancy rate in each pixel is calculated by allocating sub regions each being 1/256 to the region of a figure arranged in the pixel. Then, it becomes 8-bit occupancy data. Such square regions (inspection pixels) can be corresponding to pixels of measurement data.

Next, the reference image generation circuit 112 generates, for each measurement image, a reference image corresponding to a target measurement image by performing filtering processing on a design image corresponding to the target measurement image by using a predetermined image processing filter. Thereby, it becomes possible to match/fit design image data being design side image data, whose image intensity (gray scale level) is represented by digital values, with image generation characteristics obtained by irradiation with the multiple primary electron beams 20. Image data of the generated reference image is output to the comparison circuit 108.

Data of the measurement image input in the comparison circuit 108 is stored in the storage device 50. Further, data of the reference image input in the comparison circuit 108 is stored in the storage device 52. In the comparison circuit 108, an inspection image and a reference image, for each frame region 30, for example, are compared with each other. The frame region 30 corresponds to each region obtained by dividing the sub-irradiation region 29 into the four (2×2) regions, for example. As the frame region 30, a region of 512×512 pixels is used, for example.

In the edge extraction step (S110), the edge extraction unit 54 extracts, for each frame region 30, an edge (outline, contour) of each of a plurality of figure patterns in the measurement image (frame image 31) of target frame region 30. The edge extraction method may be the same as the conventional one. For example, it is preferable to extract, as the edge position, the maximum gradient position of a signal intensity (gray scale level) profile of an image. In other words, it is preferable to extract, for each sub-pixel, a position where a differential intensity is the maximum, which is obtained by filtering processing on an image with a differentiation filter.

In the edge extraction step (S112), the edge extraction unit 56 extracts, for each frame region 30, the edge (outline, contour) of each of a plurality of figure patterns in a reference image. The edge extraction method may be the same as that of the edge extraction step (S110).

Alternatively, the edge extraction unit 56 may extract edges (outlines, contours) of a plurality of figure patterns from data of design patterns arranged in each frame region 30 before image development.

In the alignment step (S120), the alignment unit 58 provides alignment between each edge position extracted from the frame image 31 and each edge position extracted from the reference image. For example, images are moved relatively to each other so that the positions at each of which the differential intensity is the maximum may match each other as much as possible. It is acceptable to move only one of a frame image and a reference image, or to move both of them. For example, alignment is provided by moving a frame image. For example, alignment is provided between a frame image and a reference image such that the total of differences in gray scale level at edge positions or the sum of the squares of differences in gray scale level at edge positions is the minimum. Since, in the first embodiment, the uniform sizing processing step (S104) has been performed in advance, with respect to at least the figure pattern with the reference line width, the design line width and the measurement line width are coincident with each other. The line width of an anchor pattern or that of a figure pattern which is formed more times than other figure patterns in an image is used as the reference line width. Therefore, it is possible to make many edges coincident between both the images. Thus, alignment can be easily provided by performing the uniform sizing processing step (S104).

In the line width calculation step (S130), the line width calculation unit 60 obtains a width between paired edges extracted from the frame image 31, as a measurement line width of a figure pattern.

In the line width calculation step (S132), the line width calculation unit 62 obtains a width between paired edges extracted from the reference image, as a design line width of a figure pattern.

With respect to the design line width obtained by the above processing, a uniform sizing amount has been added by resizing, and thus, the obtained line width is not the original one. Further, an error generated by the influence of the electron optical system, etc. may be included in the measurement line width. Therefore, in the first embodiment, a correction is performed as follows:

In the uniform correction step (S134), the uniform correction unit 64 (first uniform correction unit) corrects the line width of the figure pattern in a measurement image (secondary electron image) by using the uniform sizing amount $\Delta W$. Specifically, the uniform correction unit 64 uniformly subtracts the uniform sizing amount $\Delta W$ from the line width of each figure pattern in the frame image 31 (secondary electron image).

In the uniform correction step (S136), the uniform correction unit 66 (second uniform correction unit) corrects the line width of the figure pattern in a reference image by using the uniform sizing amount W. Specifically, the uniform correction unit 66 uniformly subtracts the uniform sizing amount $\Delta W$ from the line width of each figure pattern in the reference image.

Figure 12:
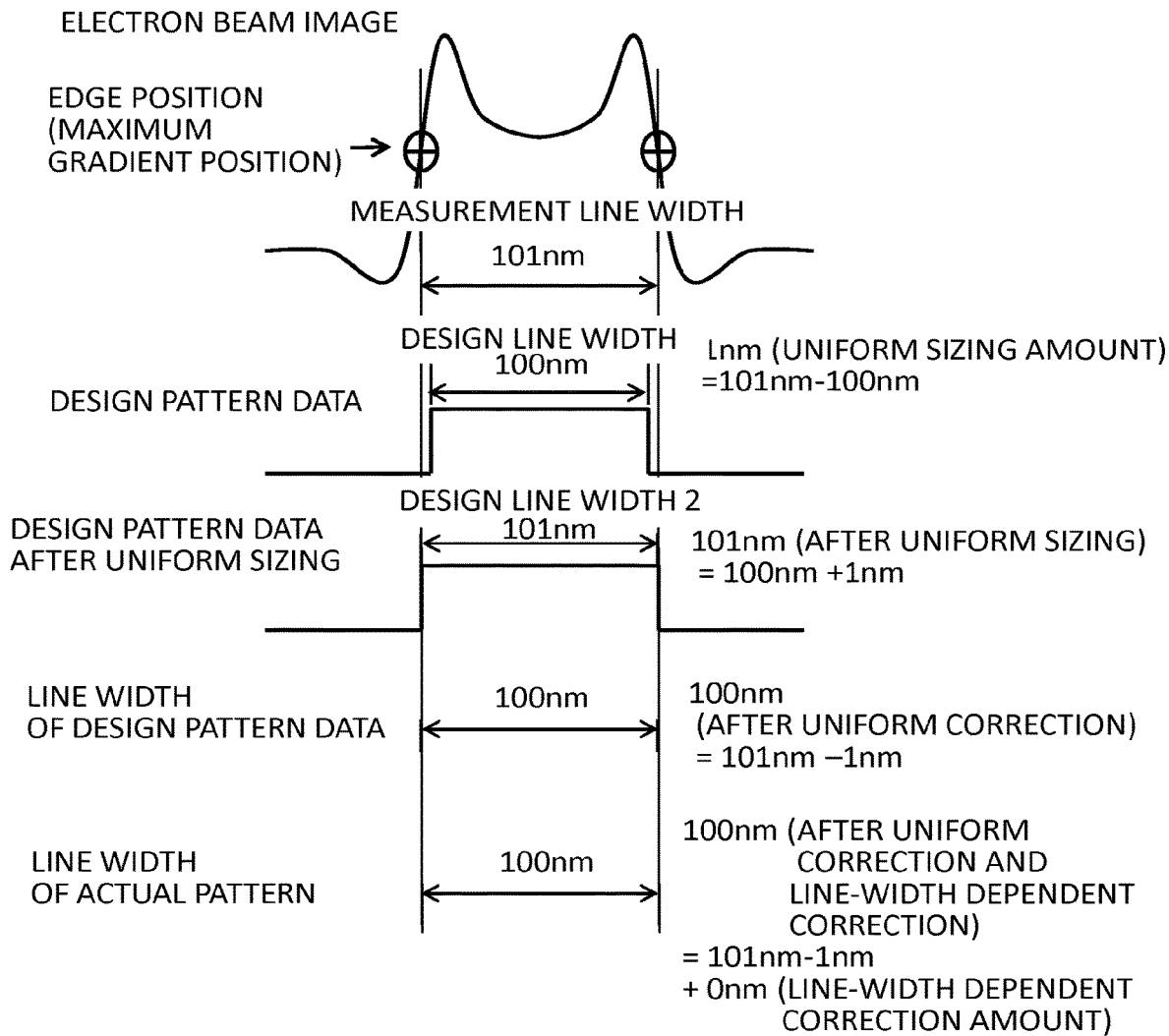
FIG. 12 is an illustration showing an example of a line width of a figure pattern having a reference line width, a line width of a design pattern, a line width of a design pattern having been uniformly sized, a line width of a design pattern after a uniform correction, and a line width of an actual pattern after a uniform correction and a line-width dependent correction according to the first embodiment.

FIG. 12 is an illustration showing an example of a line width of a figure pattern having a reference line width, a line width of a design pattern, a line width of a design pattern having been uniformly sized, a line width of a design pattern after a uniform correction, and a line width of an actual pattern after a uniform correction and a line-width dependent correction according to the first embodiment. As shown in FIG. 12, with respect to a figure pattern with a reference line width, for example, 100 nm, the measurement line width was 101 nm. Then, by performing a uniform correction of subtracting the uniform sizing amount 1 nm, the measurement line width becomes 100 nm. On the other hand, since the design line width 100 nm has been resized by uniform sizing processing, it becomes 101 nm. Then, by performing a uniform correction of subtracting the uniform sizing amount 1 nm, the design line width becomes 100 nm. Thus, the design line width can be returned to the original one.

Figure 13:
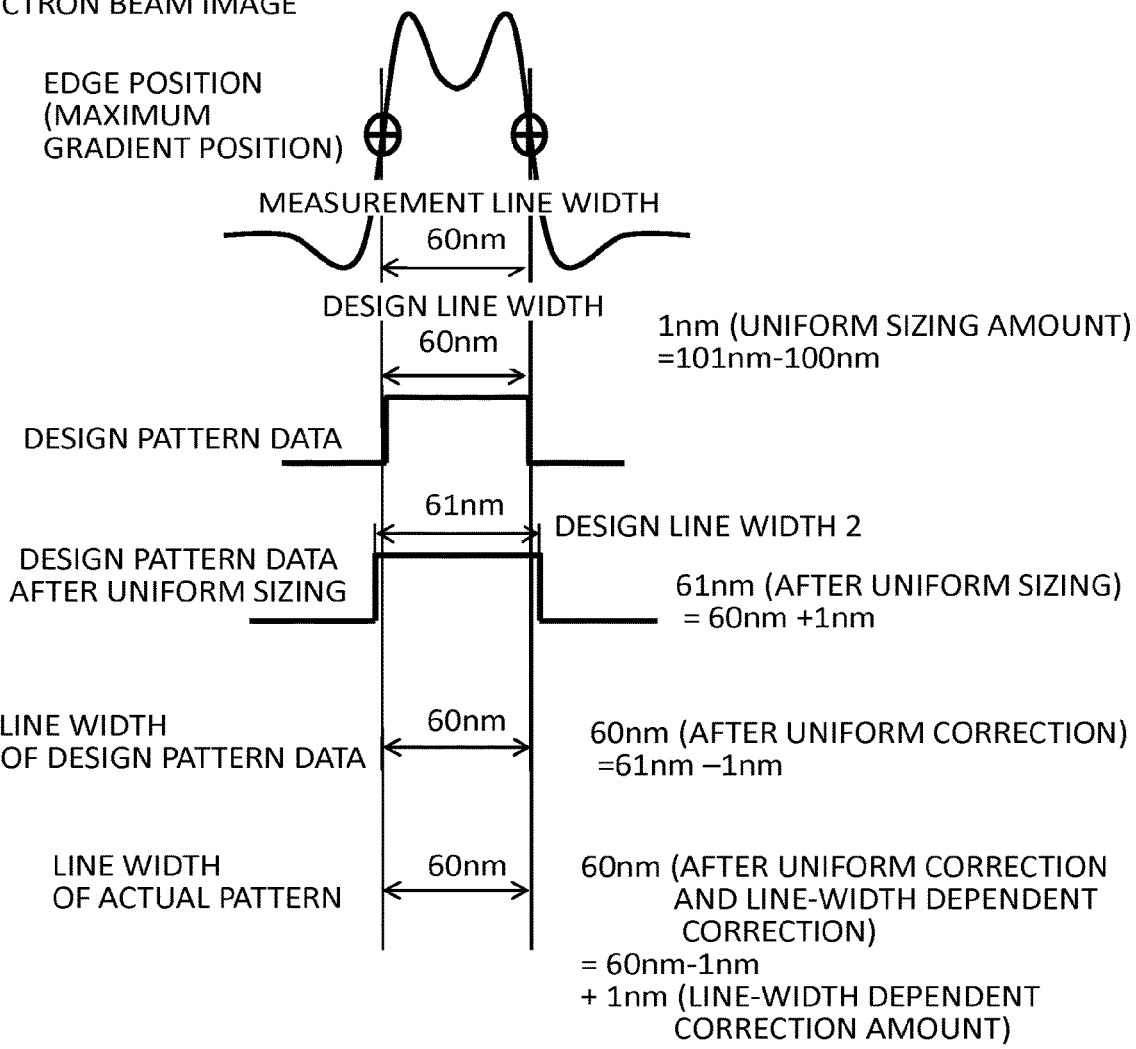
FIG. 13 is an illustration showing an example of a line width of a figure pattern having a line width other than a reference line width, a line width of a design pattern, a line width of a design pattern having been uniformly sized, a line width of a design pattern after a uniform correction, and a line width of an actual pattern after a uniform correction and a line-width dependent correction according to the first embodiment.

FIG. 13 is an illustration showing an example of a line width of a figure pattern having a line width other than a reference line width, a line width of a design pattern, a line width of a design pattern having been uniformly sized, a line width of a design pattern after a uniform correction, and a line width of an actual pattern after a uniform correction and a line-width dependent correction according to the first embodiment. As shown in FIG. 13, with respect to a figure pattern having a line width, for example, 60 nm, since the design line width of 60 nm has been resized by uniform sizing processing, it becomes 61 nm. Then, by performing a uniform correction of subtracting the uniform sizing amount 1 nm, the design line width becomes 60 nm. Thus, the design line width can be returned to the original one. In contrast, the measurement line width was 60 nm. However, by performing a uniform correction of subtracting the uniform sizing amount 1 nm, the measurement line width becomes 59 nm. Thus, an error has been generated.

Figure 14:
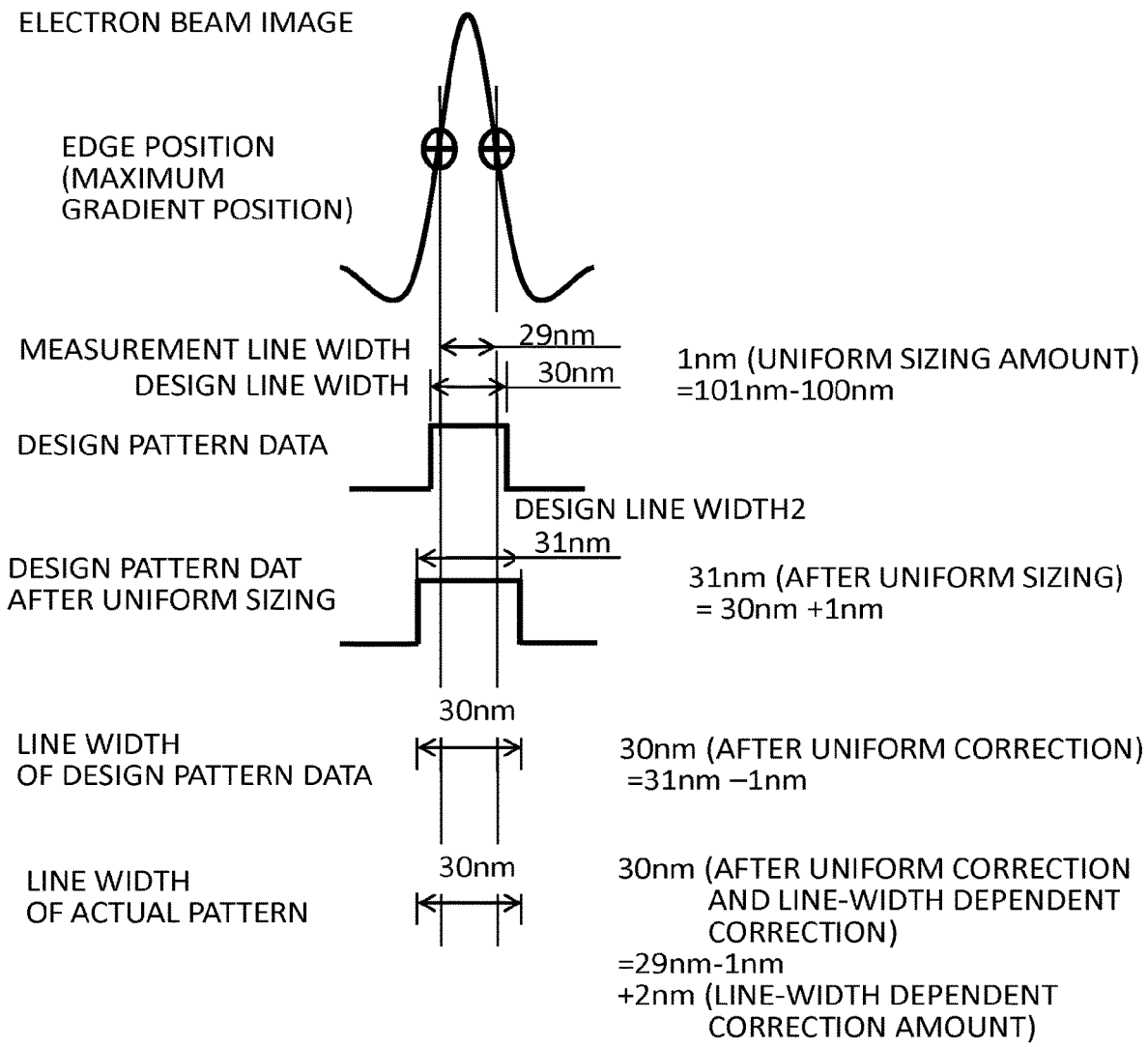
FIG. 14 is an illustration showing another example of a line width of a figure pattern having a line width other than a reference line width, a line width of a design pattern, a line width of a design pattern having been uniformly sized, a line width of a design pattern after a uniform correction, and a line width of an actual pattern after a uniform correction and a line-width dependent correction according to the first embodiment.

FIG. 14 is an illustration showing another example of a line width of a figure pattern having a line width other than a reference line width, a line width of a design pattern, a line width of a design pattern having been uniformly sized, a line width of a design pattern after a uniform correction, and a line width of an actual pattern after a uniform correction and a line-width dependent correction according to the first embodiment. As shown in FIG. 14, with respect to a figure pattern having a line width, for example, 30 nm, since the design line width of 30 nm has been resized by uniform sizing processing, it becomes 31 nm. Then, by performing a uniform correction of subtracting the uniform sizing amount 1 nm, the design line width becomes 30 nm. Thus, the design line width can be returned to the original one. In contrast, the measurement line width was 29 nm. Then, by performing a uniform correction of subtracting the uniform sizing amount 1 nm, the measurement line width becomes 28 nm. Thus, an error has been generated. Hence, according to the first embodiment, correction is performed as follows:

In the line-width dependent correction step (S138), the line-width dependent correction unit 68 (correction unit) corrects the line width of a figure pattern in the frame image 31 (secondary electron image) by using the line-width dependent correction amount p(w) which has been set in advance depending on the line width size. Here, the line-width dependent correction unit 68 corrects the line width of the figure pattern in the frame image 31 (secondary electron image) which has been corrected by the uniform sizing amount, by using the line-width dependent correction amount p(w) having been set in advance depending on the line width size. Specifically, the line-width dependent correction amount according to the line width size is added to each measurement line width. As the line-width dependent correction amount for a line width size other than a preset line width size, a value interpolated using line-width dependent correction amounts for two or more line width sizes may be used.

In the case of FIG. 12, since the figure pattern is the one having a reference line width, the line-width dependent correction amount p(w) is zero. Therefore, the measurement line width after a line-width dependent correction becomes 100 nm.

In the case of FIG. 13, since the figure pattern is the one with a line width 60 nm which is other than the reference line width, the line-width dependent correction amount is 1 nm. The measurement line width has become 59 nm by a uniform correction of subtracting the uniform sizing amount $\Delta W$ of 1 nm. Then, by adding the line-width dependent correction amount p(w) of 1 nm to the measurement line width, it can be corrected to 60 nm.

In the case of FIG. 14, since the figure pattern is the one with a line width 30 nm which is other than the reference line width, the line-width dependent correction amount is 2 nm. The measurement line width has become 28 nm by a uniform correction of subtracting the uniform sizing amount $\Delta W$ of 1 nm. Then, by adding the line-width dependent correction amount p(w) of 2 nm to the measurement line width, it can be corrected to 30 nm.

According to the first embodiment, the measurement line width after the line-width dependent correction step (S138) is used as the line width of an actual pattern.

In the comparison step (S140), the comparison unit 70 compares the line width of a figure pattern in a reference image with the line width of a corresponding figure pattern having been corrected using a line-width dependent correction amount in the frame image 31 (secondary electron image). Here, the comparison unit 70 compares the line width of the figure pattern having been corrected using the uniform sizing amount $\Delta W$ and corrected using the line-width dependent correction amount p(w) in the frame image 31 with the line width of the figure pattern having been corrected using the uniform sizing amount $\Delta W$ in the reference image. For example, if the absolute value of the difference between the measurement line width and the design line width is greater than a determination threshold, it is determined that a defect exists. Alternatively, for example, if the difference obtained by subtracting the design line width from the measurement line width is out of the range of a determination threshold, it is determined that a defect exists. The comparison result is output to the magnetic disk drive 109 and/or the monitor 117, and alternatively, output to the outside through an external I/F (not shown).

Figure 15A:
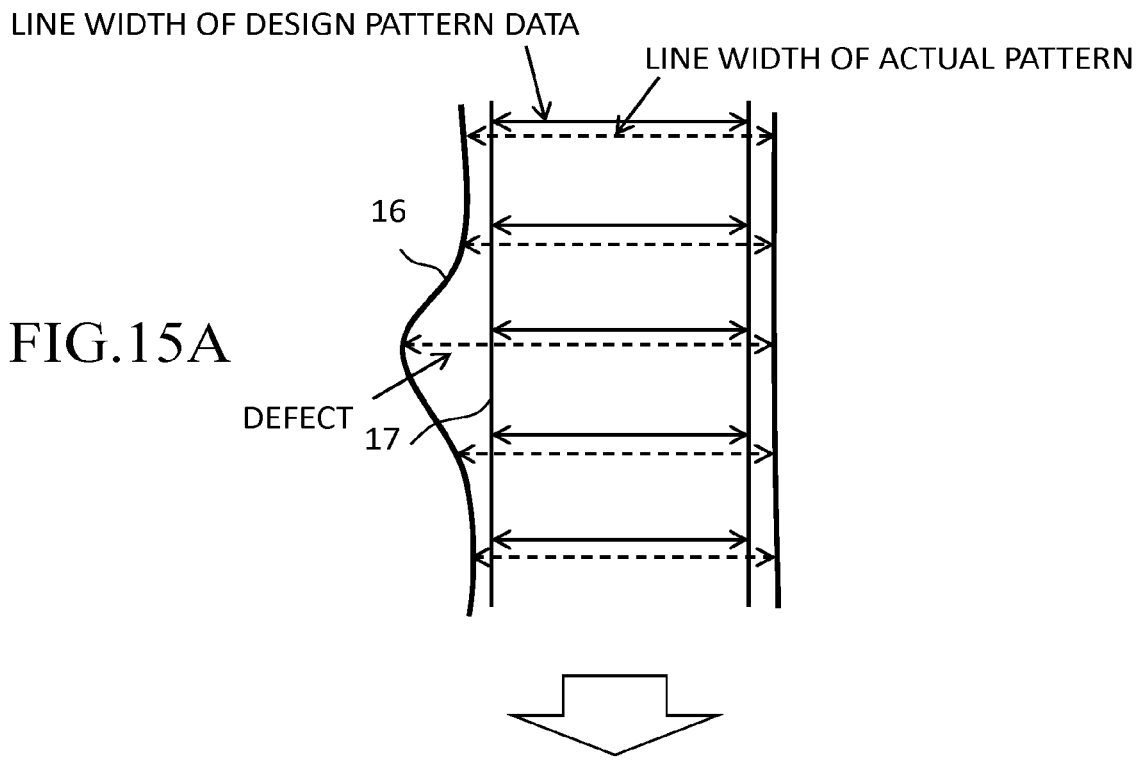
FIGS. 15A and 15B are illustrations showing examples of a line width of an actual pattern and a line width of a design pattern according to the first embodiment.
Figure 15B:
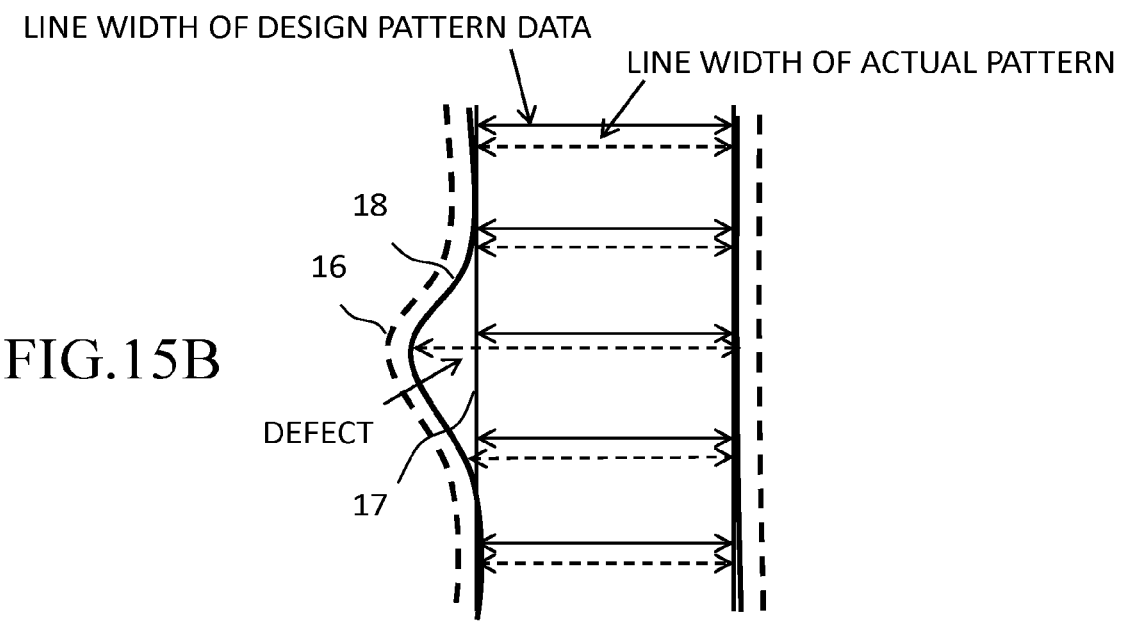

FIGS. 15A and 15B are illustrations showing examples of a line width of an actual pattern and a line width of a design pattern according to the first embodiment. As shown in FIG. 15A, when a line-width dependent correction is not performed, a deviation occurs between the line width of the actual pattern and the line width of the design pattern. Therefore, even a location/position which is not the original defect position may be detected as a defect. Accordingly, a pseudo defect may occur. In contrast, according to the first embodiment, since the measurement line width is corrected using the line-width dependent correction amount p(w), the error between the line width of the actual pattern and the line width of the design pattern is eliminated or reduced as shown in FIG. 15B. Therefore, a defect is not detected at a location/position other than the original defect position. Thus, generation of a pseudo defect can be inhibited/prevented or reduced.

Next, a positional deviation inspection for edges is described below.

In the edge deviation amount calculation step (S150), the edge deviation amount calculation unit 72 (deviation amount calculation unit) calculates an amount of deviation between the edge position of a figure pattern in a reference image and the edge position of a corresponding figure pattern in the frame image 31 (secondary electron image). For example, the distance from the edge position of a figure pattern in a reference image to the edge position of a figure pattern in the closest measurement image (secondary electron image) is calculated as an edge deviation amount.

The edge position of the figure pattern in the reference image, which is obtained by the above processing, has been moved because the uniform sizing amount was added when performing resizing. Therefore, the edge position is not the original one. Moreover, an error generated by the influence of the electron optical system, etc. may be included in the edge position of the figure pattern in the measurement image. However, since the amount of deviation between the edge position of the figure pattern in the reference image and the edge position of the figure pattern in the frame image 31 is a relative value between both the edges, even if a uniform correction is performed, as being different from the case of the line width, the result never changes. Therefore, it is unnecessary to perform uniform correction. On the other hand, after adding a uniform sizing amount, an error depending on the line width still remains. Then, according to the first embodiment, correction is performed as follows:

In the line-width dependent correction step (S152), when the line width of a figure pattern can be specified, the line-width dependent correction unit 74 corrects an edge deviation amount by using a value of one-half (½) of the line-width dependent correction amount having been set in advance depending on the size of the line width. Specifically, the line-width dependent correction unit 74 adds, in the direction of making the edge deviation amount small, a value of one-half (½) of the line-width dependent correction amount. If the line-width dependent correction amount is a positive value, the edge deviation amount becomes small. If the line-width dependent correction amount is a negative value, the edge deviation amount becomes large. When the line width of a figure pattern is not specified in the first place such as the case of not performing a line width inspection, since the line width is unknown, the line-width dependent correction amount is not specified. In that case, the line-width dependent correction step (S152) is omitted.

In the positional deviation determination step (S160), the positional deviation determination unit 76 (determination unit) determines whether the edge deviation amount (corrected deviation amount) after correction, which is performed using a value of one-half (½) of the line-width dependent correction amount when the line width of the figure pattern concerned can be specified, exceeds the determination threshold (first determination threshold) or not. If the edge deviation amount (correction deviation amount) after the correction exceeds the determination threshold (first determination threshold), it is determined that a defect exists.

When the line width of the figure pattern concerned cannot be specified, the positional deviation determination unit 76 determines whether the edge deviation amount exceeds a determination threshold (second determination threshold) or not. If the edge deviation amount exceeds the determination threshold (second determination threshold), it is determined that a defect exists. The determination threshold (second determination threshold) used in the case where the line width of the figure pattern cannot not be specified is preferably looser than the determination threshold (first determination threshold) used when the line width of the figure pattern can be specified. The determination result is output to the magnetic disk drive 109 and/or the monitor 117, and alternatively, output to the outside through an external I/F (not shown).

Figure 16A:
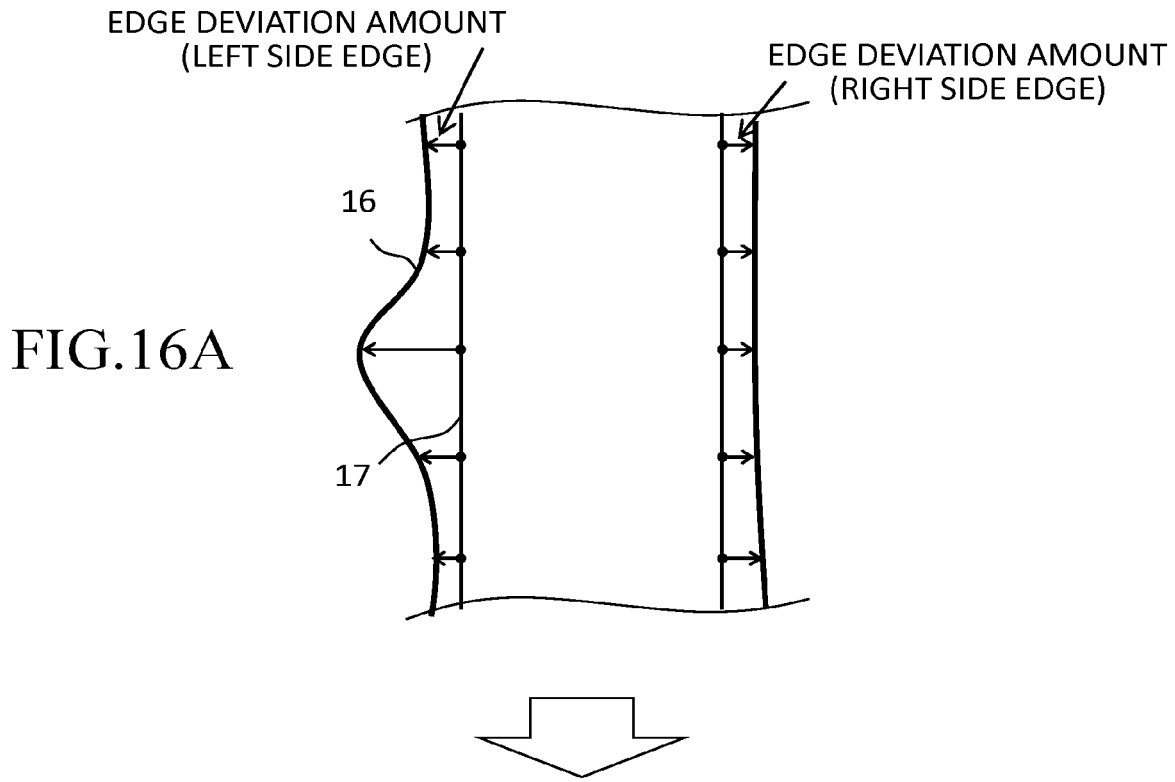
FIGS. 16A and 16B are illustrations showing examples of an edge of an actual pattern and an edge of a design pattern according to the first embodiment.
Figure 16B:
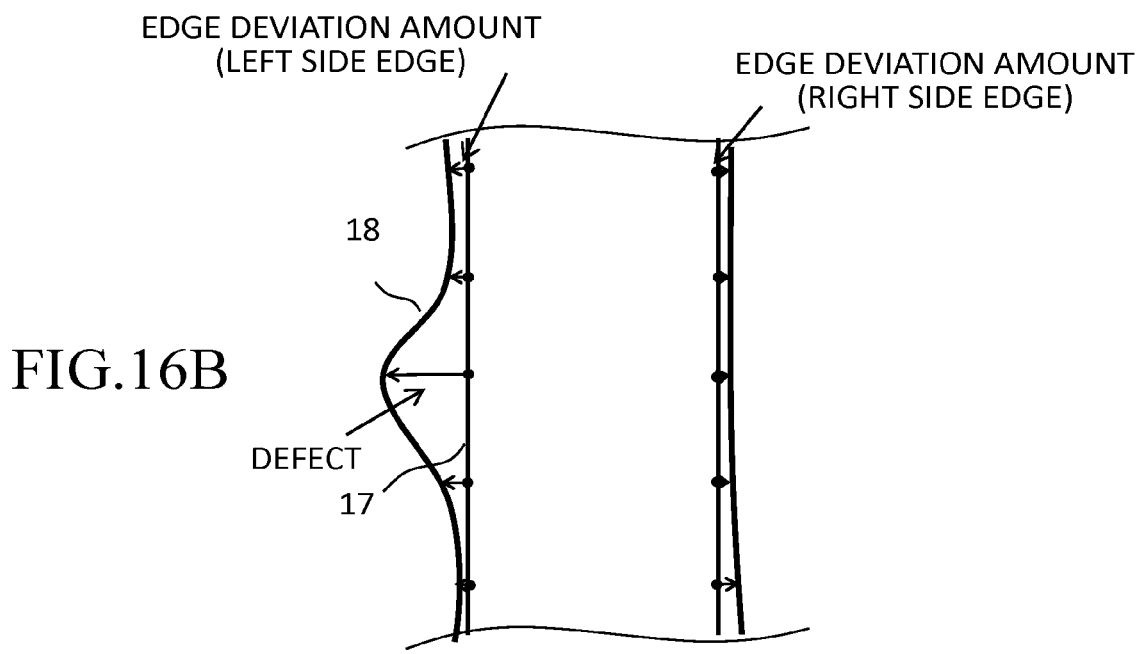

FIGS. 16A and 16B are illustrations showing examples of an edge of an actual pattern and an edge of a design pattern according to the first embodiment. As shown in FIG. 16A, when a line-width dependent correction is not performed, a deviation occurs between the edge position of the actual pattern and the edge position of the design pattern. Therefore, even a location/position which is not the original defect position may be detected as a defect. Accordingly, a pseudo defect may occur. In contrast, according to the first embodiment, since the edge position of the actual pattern is corrected, for each edge, by using one-half (½) of the line-width dependent correction amount p(w), the error between the edge position of the actual pattern and the edge position of the design pattern is eliminated or reduced as shown in FIG. 16B. Therefore, a defect is not detected at a location/position other than the original defect position. Thus, generation of a pseudo defect can be inhibited/prevented or reduced.

As described above, according to the first embodiment, line width errors between the image to be measured and the reference image can be inhibited. Thus, pseudo defects can be reduced.

In the above description, each " . . . circuit" includes processing circuitry. The processing circuitry includes an electric circuit, a computer, a processor, a circuit board, a quantum circuit, a semiconductor device, or the like. Each " . . . circuit" may use common processing circuitry (the same processing circuitry), or different processing circuitry (separate processing circuitry). Programs for causing a processor, etc. to execute processing may be stored in a recording medium, such as a magnetic disk drive, magnetic tape drive, FD, ROM (Read Only Memory) or the like. For example, the position circuit 107, the comparison circuit 108, the reference image generation circuit 112, the stage control circuit 114, the lens control circuit 124, the blanking control circuit 126, the deflection control circuit 128, the correction amount calculation circuit 130, and the sizing processing circuit 132 may be configured by at least one processing circuit described above.

Embodiments have been explained referring to specific examples as described above. However, the present invention is not limited to these specific examples. Although FIG. 1 shows the case where the multiple primary electron beams 20 are formed by the shaping aperture array substrate 203 irradiated with one beam from the electron gun 201 serving as an irradiation source, it is not limited thereto. The multiple primary electron beams 20 may be formed by applying a primary electron beam from each of a plurality of irradiation sources.

Further, if conditions for acquiring a secondary electron image, and materials for the substrate 101, such as kinds of a pattern forming film and materials for a base film, are different from each other, it is preferable to obtain a uniform sizing amount and a line-width dependent correction amount under each condition and to parameterize them for use.

While the apparatus configuration, control method, and the like not directly necessary for explaining the present invention are not described, some or all of them can be appropriately selected and used on a case-by-case basis when needed.

Further, any pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
a secondary electron image acquisition mechanism configured to acquire, by using an electron beam, a secondary electron image of a figure pattern formed on a substrate;
a uniform sizing processing circuit configured to resize a line width of a design pattern being a basis of the figure pattern by using a uniform sizing amount which has been set in advance;
a reference image generation circuit configured to generate a reference image corresponding to the secondary electron image by performing image development on data of the design pattern whose line width has been resized;
a line-width dependent correction circuit configured to correct a line width of a figure pattern in the secondary electron image by using a correction amount which has been set in advance depending on a line width size; and
a comparison circuit configured to compare a line width of a figure pattern in the reference image with the line width, having been corrected by using the correction amount, of the figure pattern in the secondary electron image, the figure pattern in the secondary electron image being corresponding to the figure pattern in the reference image.

2. The apparatus according to claim 1, wherein, using an evaluation substrate on which a figure pattern having a reference line width size is arranged, a difference between a line width of the figure pattern in a secondary electron image acquired from the evaluation substrate, and a line width of a figure pattern having the reference line width size in a reference image corresponding to the secondary electron image acquired from the evaluation substrate is used as the uniform sizing amount.

3. The apparatus according to claim 1, wherein, using an evaluation substrate on which a figure pattern having a reference line width size is arranged, a difference between a line width of the figure pattern in a secondary electron image acquired from the evaluation substrate, and a line width of a design pattern having the reference line width size in a region corresponding to the secondary electron image acquired from the evaluation substrate is used as the uniform sizing amount.

4. The apparatus according to claim 1, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of figure patterns, corresponding to the different line width sizes, in at least one reference image acquired by performing image development on data of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

5. The apparatus according to claim 1, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

6. The apparatus according to claim 1, further comprising:
a first uniform correction circuit configured to correct the line width of the figure pattern in the secondary electron image by using the uniform sizing amount; and
a second uniform correction circuit configured to correct the line width of the figure pattern in the reference image by using the uniform sizing amount, wherein
the line-width dependent correction circuit corrects the line width, having been corrected by using the uniform sizing amount, of the figure pattern in the secondary electron image by using the correction amount which has been set in advance depending on the line width size, and
the comparison circuit compares the line width, having been corrected by using the uniform sizing amount and corrected by using the correction amount, of the figure pattern in the secondary electron image with the line width, having been corrected by using the uniform sizing amount, of the figure pattern in the reference image.

7. A pattern inspection apparatus comprising:
a secondary electron image acquisition mechanism configured to acquire, by using an electron beam, a secondary electron image of a figure pattern formed on a substrate;
a uniform sizing processing circuit configured to resize a line width of a design pattern being a basis of the figure pattern by using a uniform sizing amount which has been set in advance;
a reference image generation circuit configured to generate a reference image corresponding to the secondary electron image by performing image development on data of the design pattern whose line width has been resized;
a deviation amount calculation circuit configured to calculate a deviation amount between an edge position of a figure pattern in the reference image and an edge position of a figure pattern which corresponds to the figure pattern in the reference image, in the secondary electron image;

a line-width dependent correction circuit configured to correct, in a case where a line width of a figure pattern concerned can be specified, the deviation amount by using a value of one-half of a correction amount which has been set in advance depending on a line width size; and
a determination circuit configured to determine, in the case where the line width of the figure pattern concerned can be specified, whether a corrected deviation amount which has been corrected by using the value of one-half of the correction amount exceeds a first determination threshold.

8. The apparatus according to claim 7, wherein, using an evaluation substrate on which a figure pattern having a reference line width size is arranged, a difference between a line width of the figure pattern in a secondary electron image acquired from the evaluation substrate, and a line width of a figure pattern having the reference line width size in a reference image corresponding to the secondary electron image concerned is used as the uniform sizing amount.

9. The apparatus according to claim 7, wherein, using an evaluation substrate on which a figure pattern having a reference line width size is arranged, a difference between a line width of the figure pattern in a secondary electron image acquired from the evaluation substrate, and a line width of a design pattern having the reference line width size in a region corresponding to the secondary electron image concerned is used as the uniform sizing amount.

10. The apparatus according to claim 7, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of figure patterns, corresponding to the different line width sizes, in at least one reference image acquired by performing image development on data of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

11. The apparatus according to claim 7, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

12. A pattern inspection method comprising:
acquiring, by using an electron beam, a secondary electron image of a figure pattern formed on a substrate;
resizing a line width of a design pattern being a basis of the figure pattern by using a uniform sizing amount which has been set in advance;
generating a reference image corresponding to the secondary electron image by performing image development on data of the design pattern whose line width has been resized;

correcting a line width of a figure pattern in the secondary electron image by using a correction amount which has been set in advance depending on a line width size; and comparing a line width of a figure pattern in the reference image with the line width, having been corrected by using the correction amount, of the figure pattern in the secondary electron image, the figure pattern in the secondary electron image being corresponding to the figure pattern in the reference image, and outputting a comparison result.

13. The method according to claim 12, wherein, using an evaluation substrate on which a figure pattern having a reference line width size is arranged, a difference between a line width of the figure pattern in a secondary electron image acquired from the evaluation substrate, and a line width of a figure pattern having the reference line width size in a reference image corresponding to the secondary electron image concerned is used as the uniform sizing amount.

14. The method according to claim 12, wherein, using an evaluation substrate on which a figure pattern having a reference line width size is arranged, a difference between a line width of the figure pattern in a secondary electron image acquired from the evaluation substrate, and a line width of a design pattern having the reference line width size in a region corresponding to the secondary electron image concerned is used as the uniform sizing amount.

15. The method according to claim 12, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of figure patterns, corresponding to the different line width sizes, in at least one reference image acquired by performing image development on data of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

16. The method according to claim 12, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

17. The method according to claim 12, further comprising:

correcting the line width of the figure pattern in the secondary electron image by using the uniform sizing amount; and correcting the line width of the figure pattern in the reference image by using the uniform sizing amount, wherein in a case of the correcting by using the correction amount, the line width, having been corrected by using the uniform sizing amount, of the figure pattern in the secondary electron image is corrected by using the correction amount which has been set in advance depending on the line width size, and in a case of the comparing, the line width, having been corrected by using the uniform sizing amount and having been corrected by using the correction amount, of the figure pattern in the secondary electron image is compared with the line width, having been corrected by using the uniform sizing amount, of the figure pattern in the reference image.

18. A pattern inspection method comprising:

acquiring, by using an electron beam, a secondary electron image of a figure pattern formed on a substrate;

resizing a line width of a design pattern being a basis of the figure pattern by using a uniform sizing amount which has been set in advance;

generating a reference image corresponding to the secondary electron image by performing image development on data of the design pattern whose line width has been resized;

calculating a deviation amount between an edge position of a figure pattern in the reference image and an edge position of a figure pattern which corresponds to the figure pattern in the reference image, in the secondary electron image;

correcting, in a case where a line width of a figure pattern concerned can be specified, the deviation amount by using a value of one-half of a correction amount which has been set in advance depending on a line width size; and determining, in the case where the line width of the figure pattern concerned can be specified, whether a corrected deviation amount which has been corrected by using the value of one-half of the correction amount exceeds a first determination threshold.

19. The method according to claim 18, wherein, using an evaluation substrate on which a figure pattern having a reference line width size is arranged, a difference between a line width of the figure pattern in a secondary electron image acquired from the evaluation substrate, and a line width of a figure pattern having the reference line width size in a reference image corresponding to the secondary electron image concerned is used as the uniform sizing amount.

20. The method according to claim 18, wherein, using an evaluation substrate on which a figure pattern having a reference line width size is arranged, a difference between a line width of the figure pattern in a secondary electron image acquired from the evaluation substrate, and a line width of a design pattern having the reference line width size in a region corresponding to the secondary electron image concerned is used as the uniform sizing amount.

21. The method according to claim 18, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of figure patterns, corresponding to the different line width sizes, in at least one reference image acquired by performing image development on data of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

22. The method according to claim 18, wherein, using an evaluation substrate on which a plurality of figure patterns having different line width sizes are arranged, one of a difference between a line width of each of the plurality of figure patterns, corresponding to the different line width sizes, in a secondary electron image acquired from the evaluation substrate, and a line width of each of a plurality of design patterns obtained by resizing a plurality of design patterns being a basis of the plurality of figure patterns in the secondary electron image by using the uniform sizing amount, and a value obtained by a linear interpolation using the difference between at least two line width sizes, is used as the correction amount depending on the line width size.

* * * * *